United States Patent
Hsiao et al.

(10) Patent No.: US 6,577,307 B1
(45) Date of Patent: Jun. 10, 2003

(54) ANTI-ALIASING FOR THREE-DIMENSIONAL IMAGE WITHOUT SORTING POLYGONS IN DEPTH ORDER

(75) Inventors: Chien-Chung Hsiao, Hsinchu (TW); Li-Shu Lu, Hsinchu (TW)

(73) Assignee: Silicon Integrated Systems Corp., Hsin-Chu (TW)

( * ) Notice: Subject to any disclaimer, the term of this patent is extended or adjusted under 35 U.S.C. 154(b) by 0 days.

(21) Appl. No.: 09/399,619

(22) Filed: Sep. 20, 1999

(51) Int. Cl.[7] ............................................. G06T 15/40
(52) U.S. Cl. ..................... 345/422; 345/421; 345/423; 345/581; 345/582; 345/539; 345/540
(58) Field of Search ................................ 345/422, 582, 345/540, 539, 421, 423, 581; 358/3.21

(56) References Cited

U.S. PATENT DOCUMENTS

| | | | |
|---|---|---|---|
| 4,780,711 A | | 10/1988 | Doumas .................... 340/728 |
| 4,945,500 A | * | 7/1990 | Deering |
| 5,123,085 A | | 6/1992 | Wells et al. ................ 395/121 |
| 5,872,868 A | * | 2/1999 | Curry ....................... 358/3.21 |
| 5,872,902 A | * | 2/1999 | Kuchkuda et al. |

OTHER PUBLICATIONS

Watt, A., Et Al. "Advance Animation and Rendering Techniques Theory and Practice." *ACM Press* (1992) pp. 120–132.
Watt, A. Et Al., Advance Animation and Rendering Techniques Theory and Practice, ACM Press, N.Y., pp. 120–132.

* cited by examiner

Primary Examiner—Almis R. Jankus
Assistant Examiner—Kimbinh T. Nguyen
(74) Attorney, Agent, or Firm—Ladas & Parry

(57) ABSTRACT

An anti-aliasing process without sorting the polygons in depth order to improve the image quality in three-dimensional graphics system. This method comprises extra buffer memory than does a typical three-dimensional graphics display system. The Z buffer stores the depth value of nearest pixel in front Z buffer and depth value of secondary nearest pixels in back Z buffer. The color buffer stores foreground color and background color. A weighting value is used and stored in the frame buffer to blend the foreground color and the background nearest color. The weighting value is associated with each pixel, it indicates the percentage of coverage of a pixel. Every pixel in Z buffer test stage will update the depth of the nearest pixel and the depth of the second nearest in Z-buffer, foreground color and background color in the frame buffer and the weighting value according to the result of depth comparison.

21 Claims, 18 Drawing Sheets

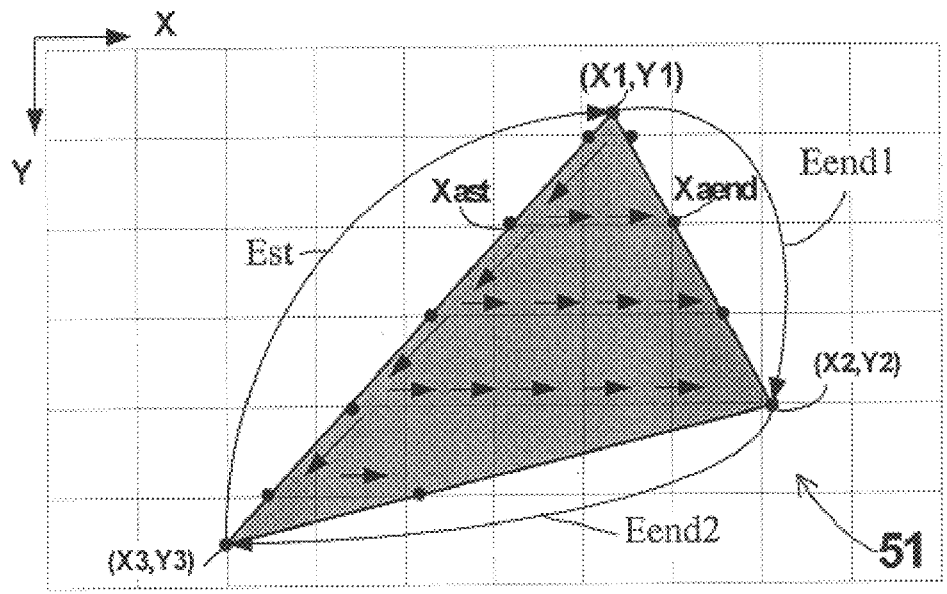
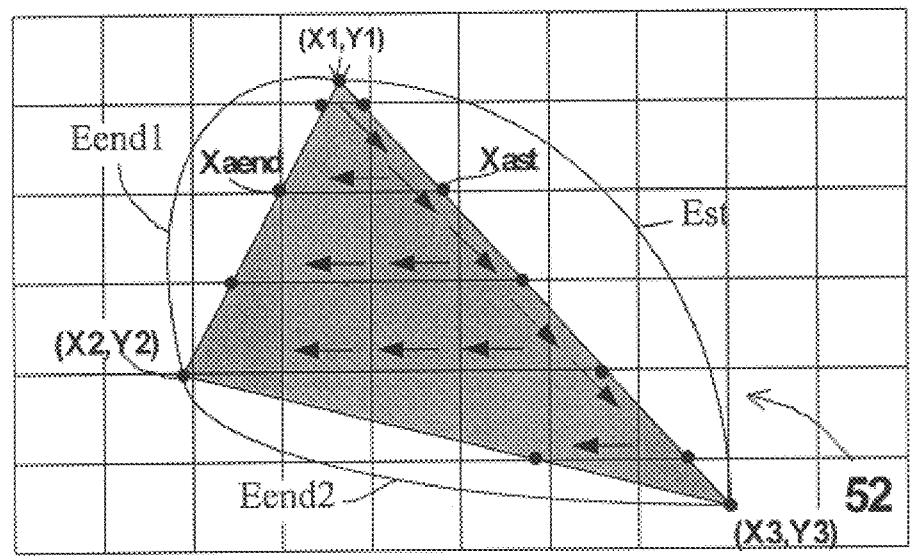
Fig. 5

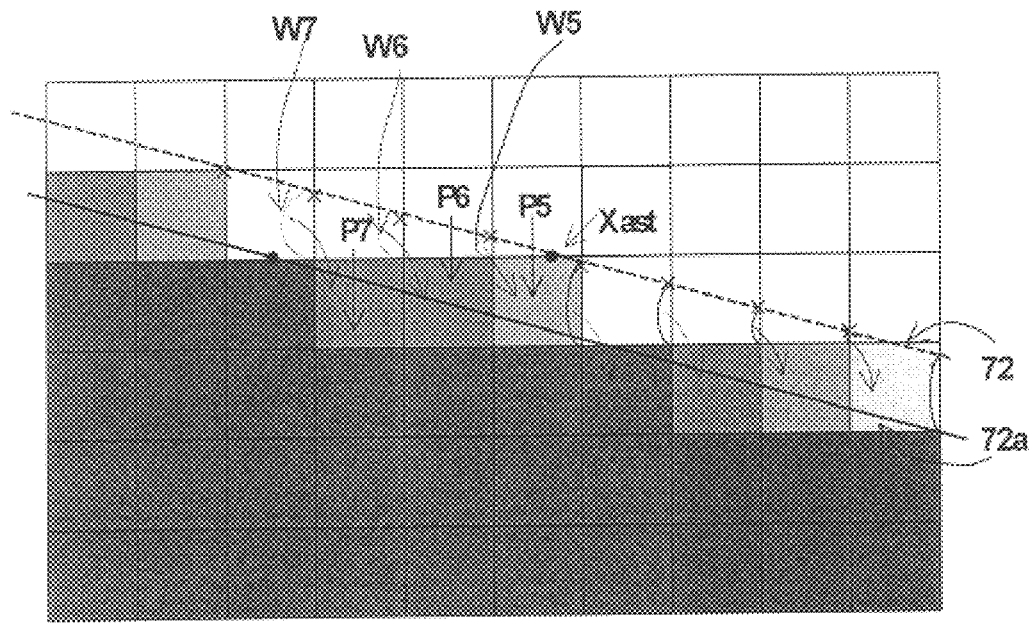
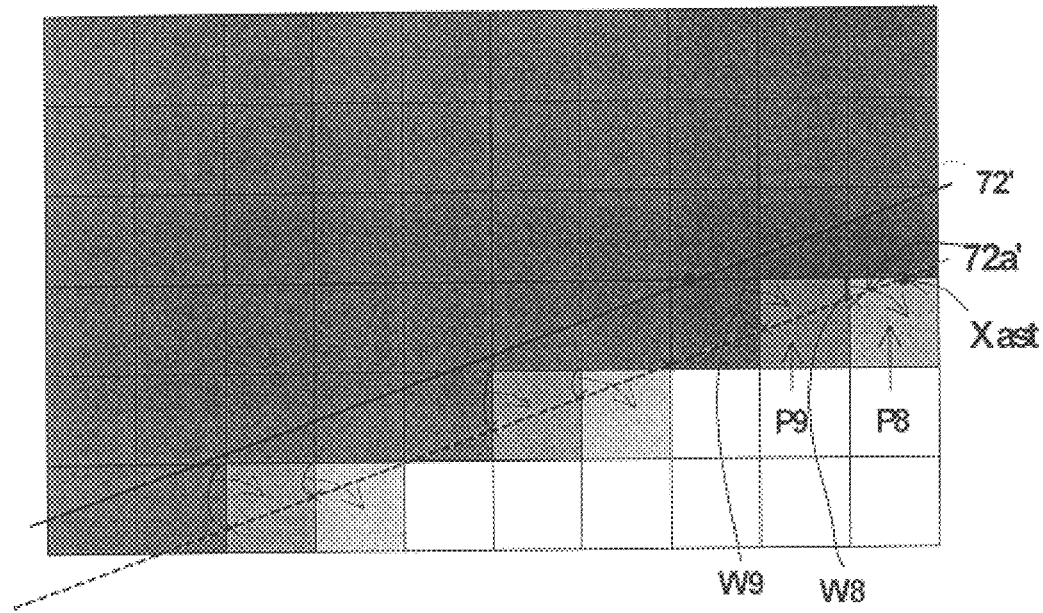
Fig. 7B

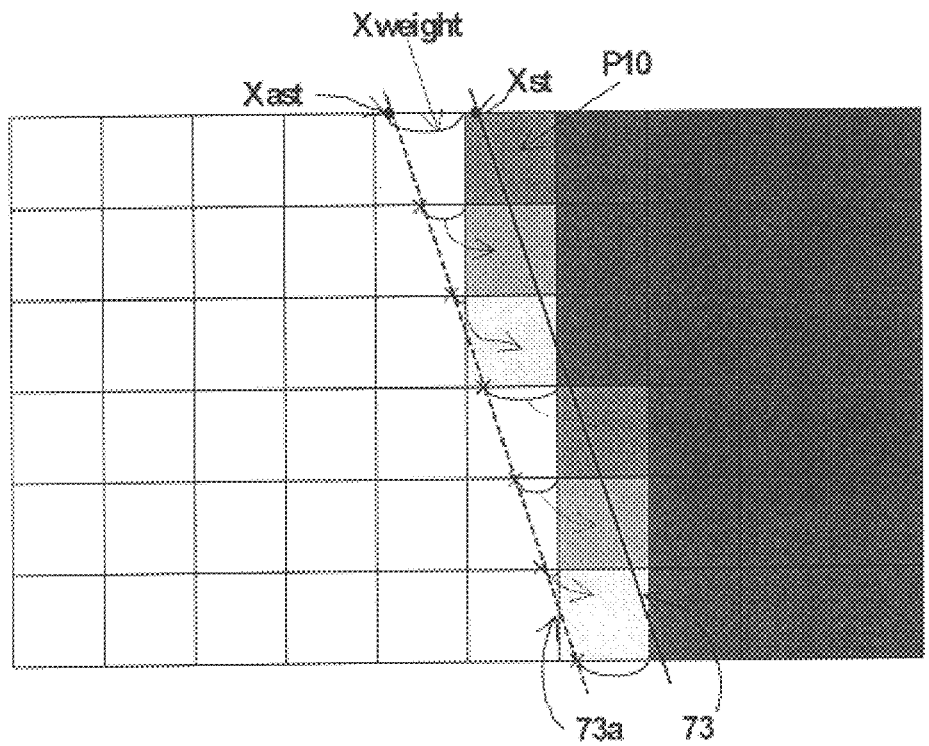
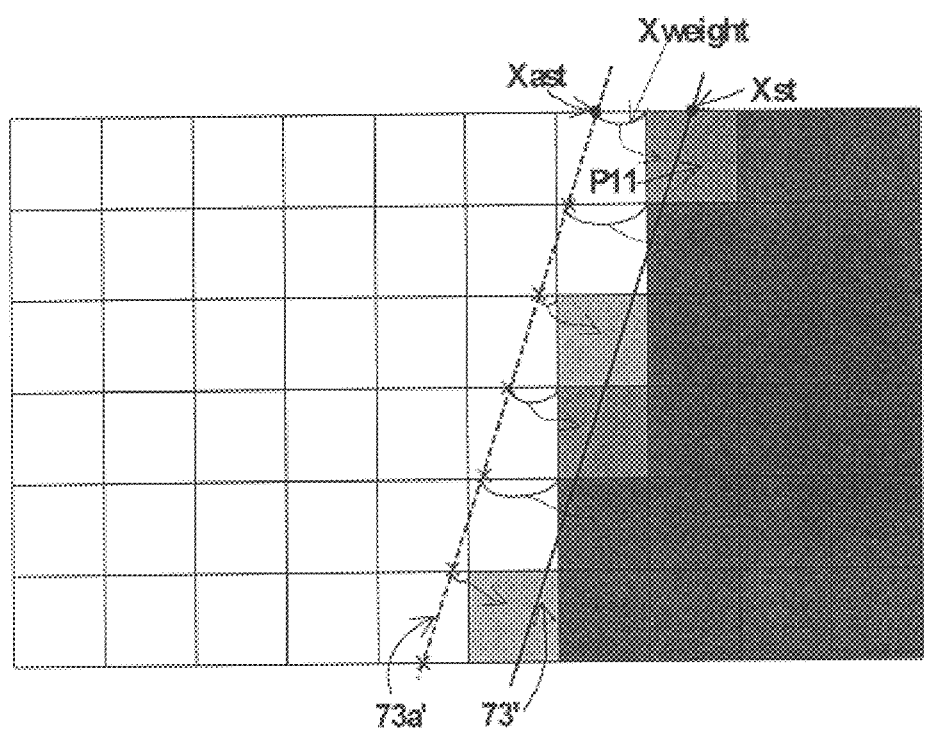
Fig. 7C

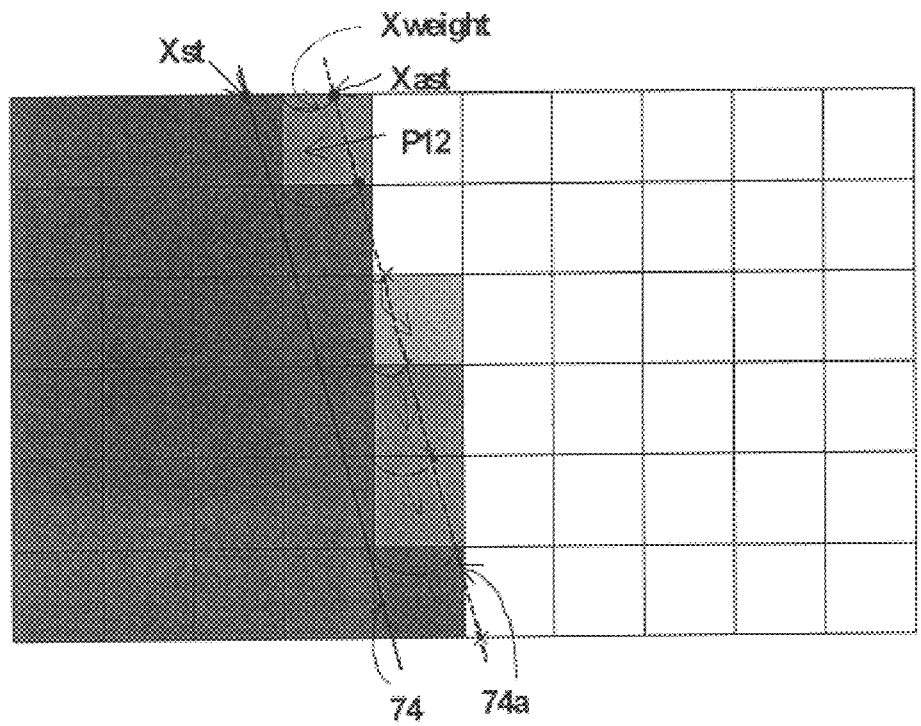
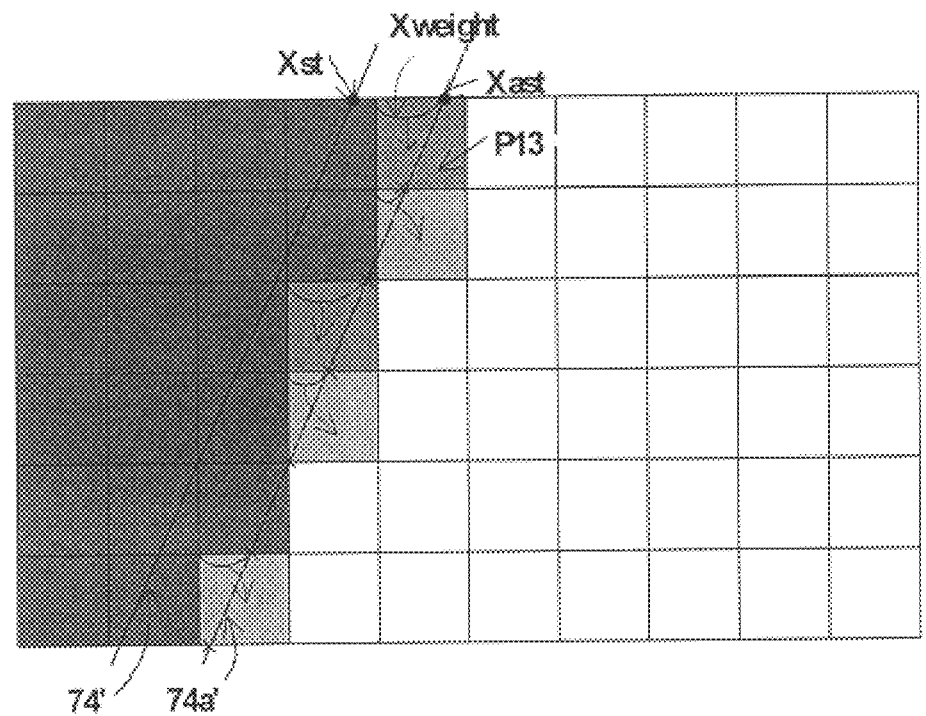
Fig. 7D

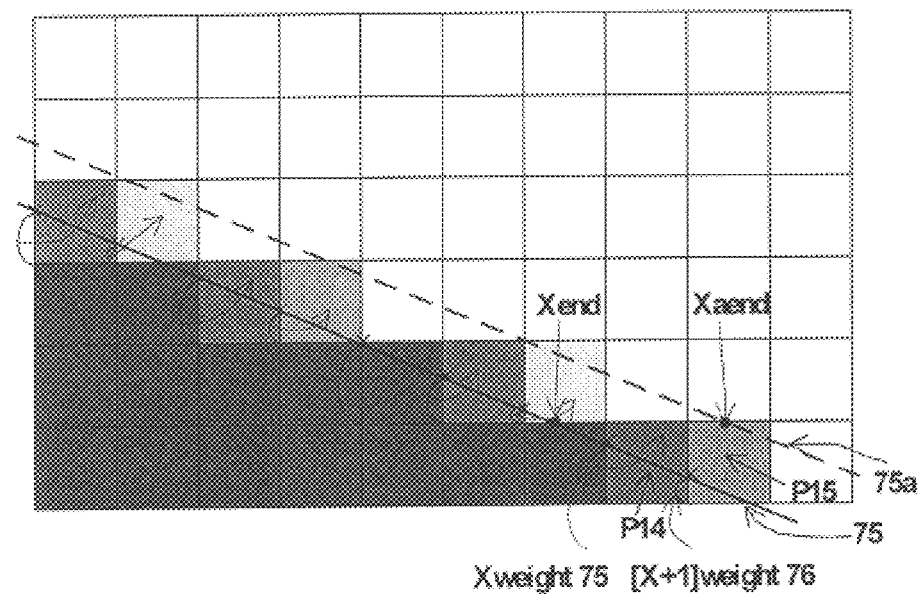
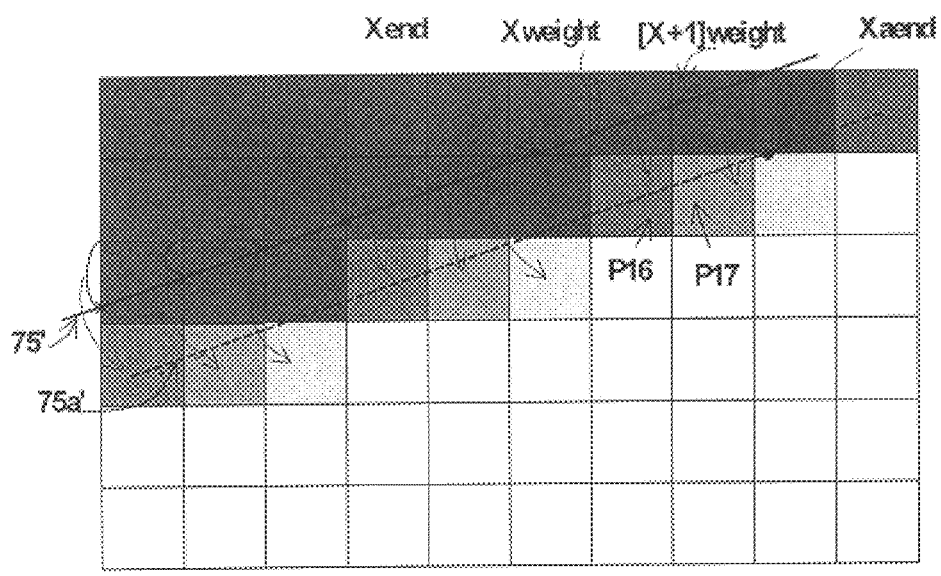
Fig. 7E

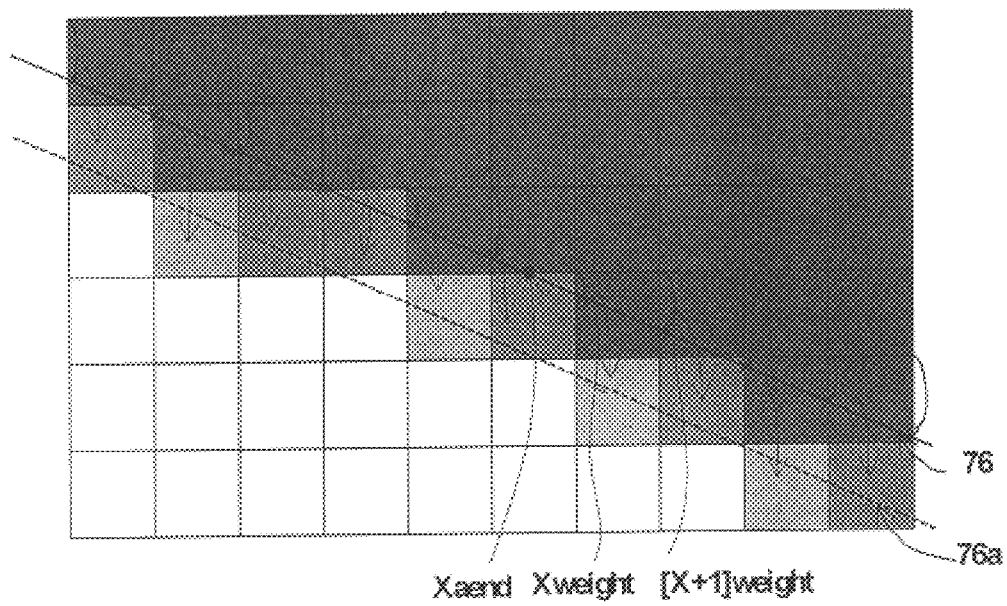
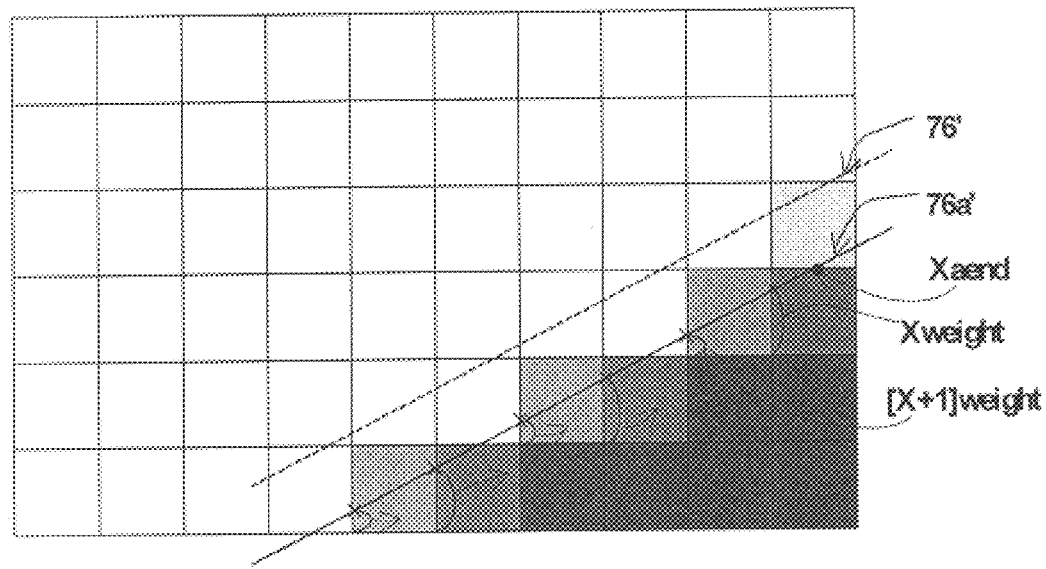
Fig. 7F

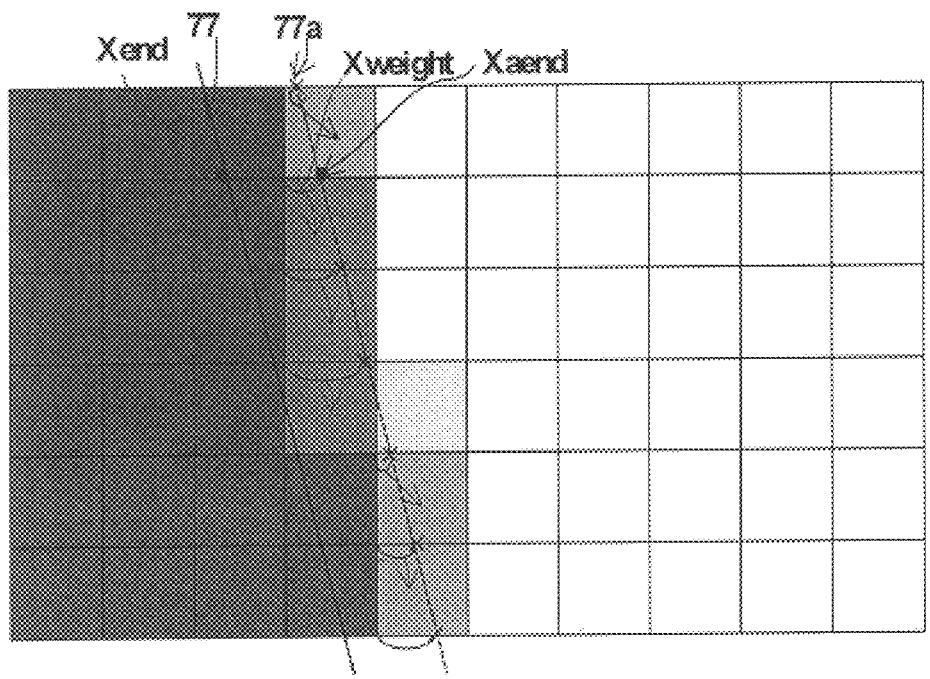
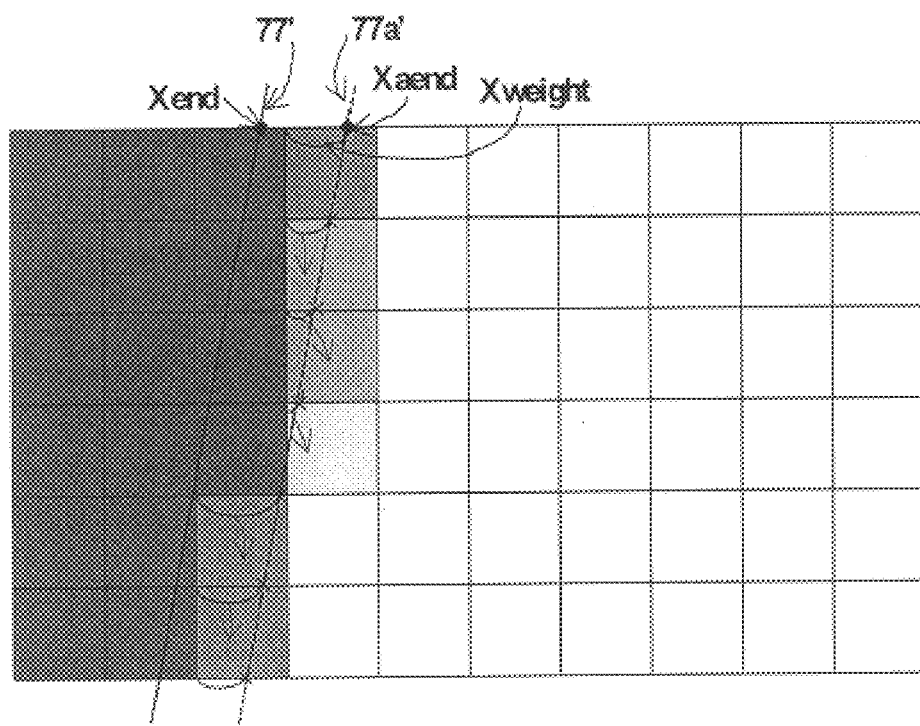
Fig. 7G

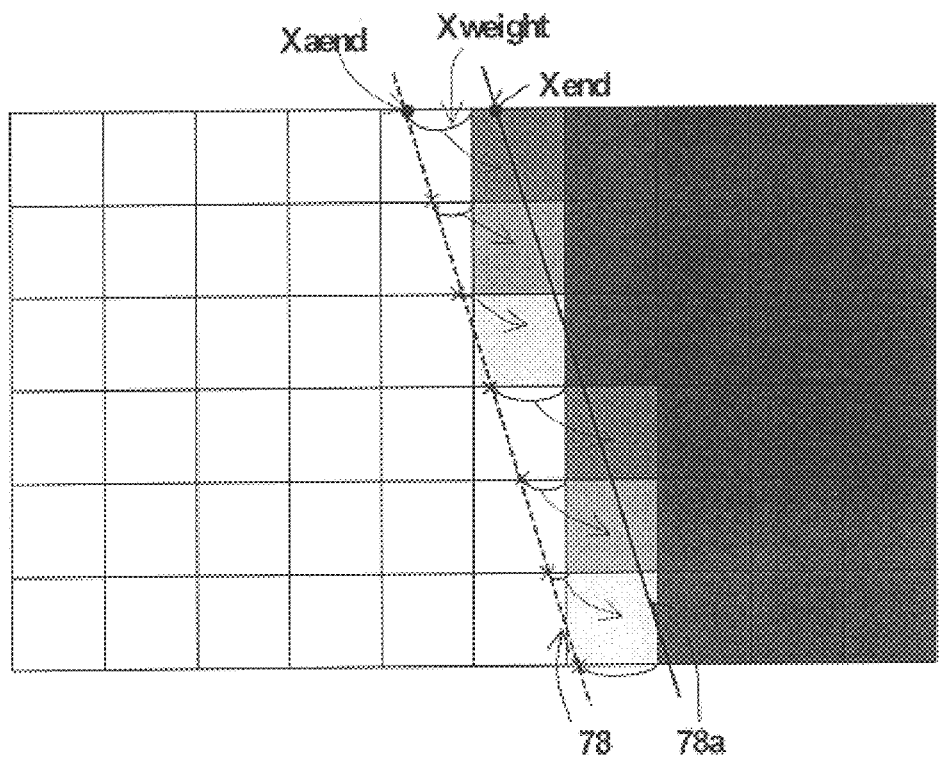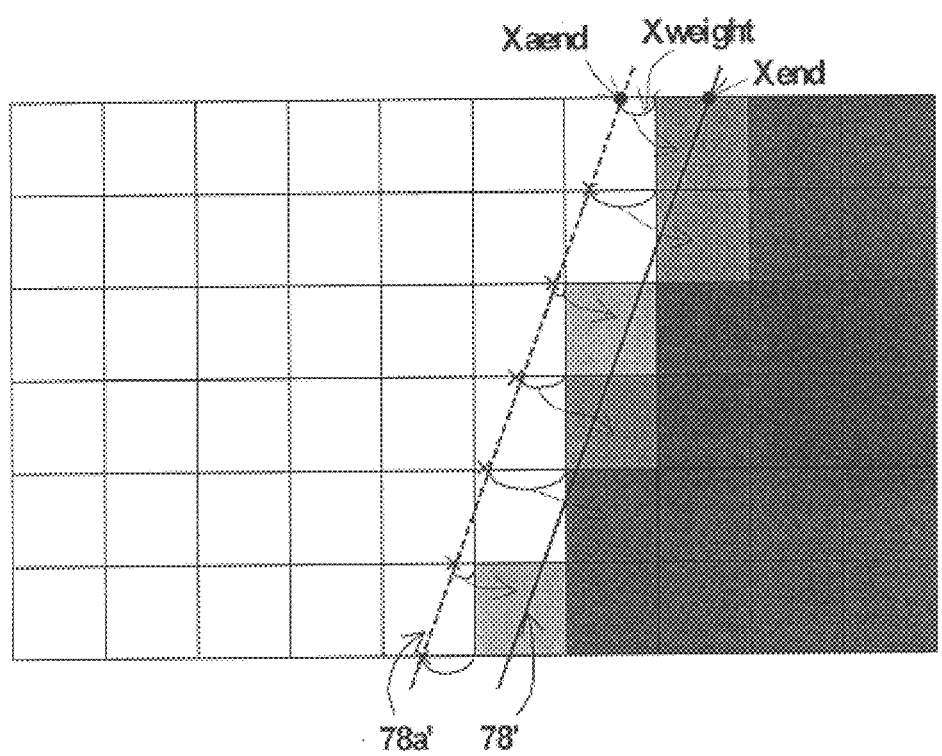
Fig. 7H

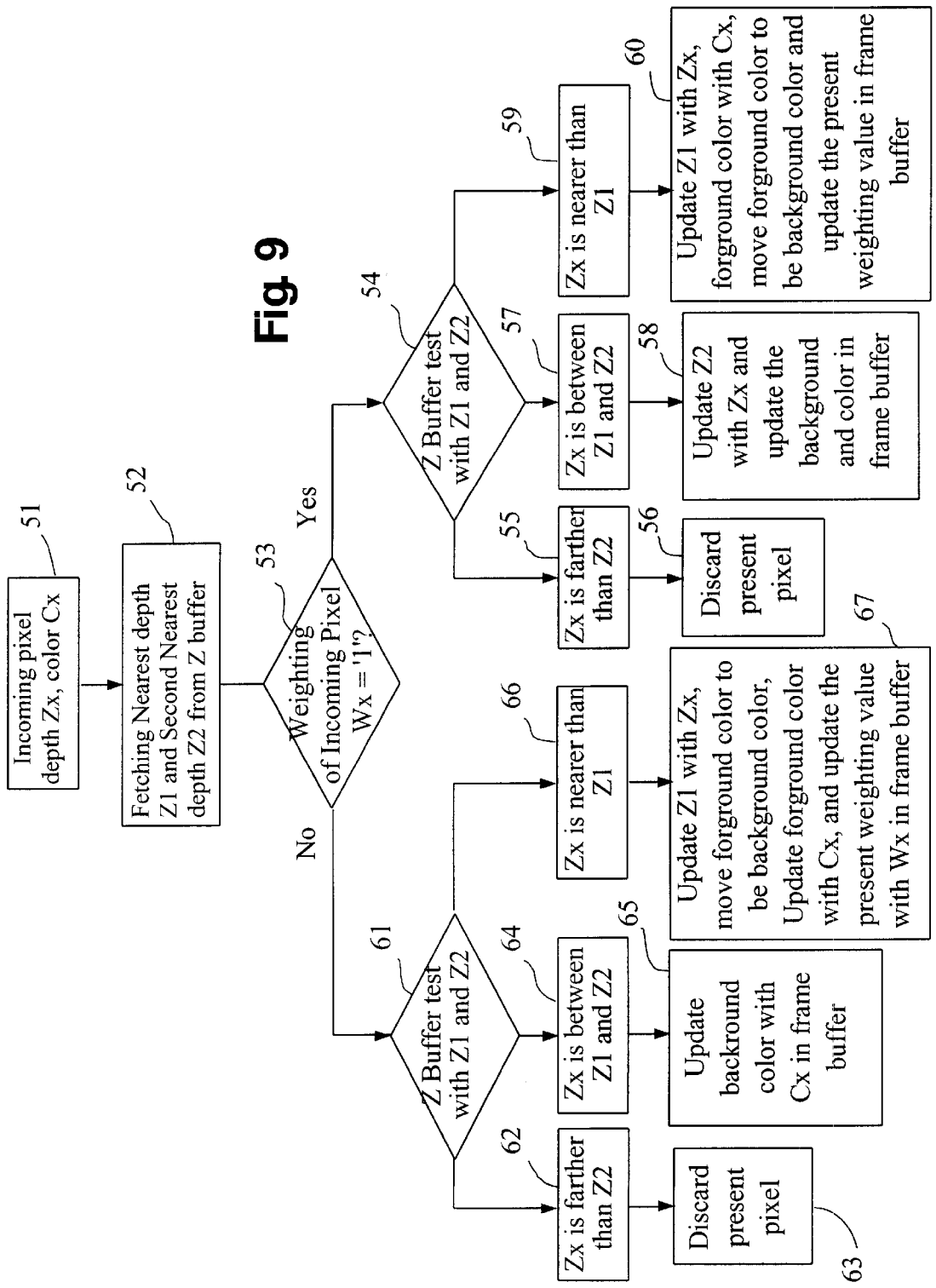

ANTI-ALIASING FOR THREE-DIMENSIONAL IMAGE WITHOUT SORTING POLYGONS IN DEPTH ORDER

FIELD OF THE INVENTION

This invention relates to rendering of three-dimensional graphics display system, and more specifically to a system and method for anti-aliasing polygons edge without sorting polygons in depth order.

BACKGROUND OF THE INVENTION

In a conventional three-dimensional graphics display system, the image content usually comprises of lots of polygons. In the rasterizing process, the polygons are rasterized according to their vertices. Raster image device performs scan conversion algorithm to produce final image. The outlines of polygons are first determined by the raster image device and then the pixels between the edges of polygons are filled. This is a point sampling process in two-dimensional raster grid. Because of the limited resolution of display screen, when an edge is at oblique angle with respect to the direction of the raster scan, jagged spots may result in and an aliasing image being produced on the screen. The so-called anti-aliasing is a scan convergence technique to smooth jagged oblique edges. This smoothing technique is usually a process of blending the present pixels and background pixels according to the percentage of covered areas of the present pixels partially covered by the edges of the polygons. In the conventional three-dimensional graphics display system, the polygon must be sorted in depth order to reveal whether the pixel to be rasterized is in the foreground or in the background. This is a time-consuming process. U.S. Pat. No. 4,780,711 shows a previous approach of scan convergence but doesn't address the depth-sorting problem when applied to three-dimensional graphics display systems. Area-averaged accumulation buffer or A-buffer is another technique of anti-aliasing method (see Alan Watt and Mark Watt, Advance Animation and Rendering Techniques Theory and Practice, p. 127 The A-buffer) wherein coverage of an area is accomplished by using a bit-wise logical operator. However, A-buffer suffers from the problem of having to search all of the fragments which cover every pixel. Super sampling is another method of anti-aliasing that increases the resolution of the image and down sample to a final image (see Alan Watt and Mark Watt, Advance Animation and Rendering Techniques Theory and Practice, p. 124 Practical super sampling algorithms). However, super sampling consumes much more memory than original non-super sampling, thus drastically increasing hardware costs and complexity. U.S. Pat. No. 5,123,085 provides an anti-aliasing process without depth sorting by calculating every incoming pixel's coverage and combining it with the present background. This method does not really solve the polygons depth-sorting problem since the order of input changes and final color changes, too. Unlike the above techniques computing the covered area of the pixels, the present application instead performs a new scan convergence process by simply computing the distance from the expanded edge to the original edge and method without sorting polygons in depth order, thus reducing the computational complexity while still obtaining a acceptable resolution to anti-aliasing. It can achieve high image quality but consumes less memory than the super sampling method.

SUMMARY OF THE INVENTION

The present application is directed to a method for anti-aliasing three-dimensional graphics without the need of sorting polygons in depth order. Z buffers, including first and second Z sub-buffers and frame buffer including first and second sub-buffers, are operative to store the depth and color of the pixels nearest and second nearest to the viewer on the screen, respectively. A value (weighting value) which indicates the coverage area of every pixel within the expanded regions, is stored. The weighting value is calculated according to the oblique angle of polygon edge and the coordinate of the pixel. There are eight algorithm to calculate said weighting value. Finally an anti-aliasing image is generated by blending the foreground color and background color by said weighting value.

The aforementioned steps implemented by the rasterized device can be implemented by a computer program recorded on a recording medium readable by a general purpose computer. Said recording medium may be a floppy disk, a hard disk, a CD-ROM, a magnetic tape, or other forms of memory.

BRIEF DESCRIPTION OF THE DRAWINGS

FIG. 5 shows the definition of polygon edge and outline.

FIGS. 7A–D show the calculation of the weighting values of pixels within rasterizing for various starting edges Est in FIG. 2 having different slopes and orientations.

FIGS. 7E–H show the calculation of said weighting value in various orientation of rasterizing end edge Eend1 and Eend2 in FIG. 2.

FIG. 9 shows the flow chart of Z buffer test of the present application to achieve anti-aliasing without sorting polygons in depth order.

DETAILED DESCRIPTION OF THE INVENTION

Figure 1:
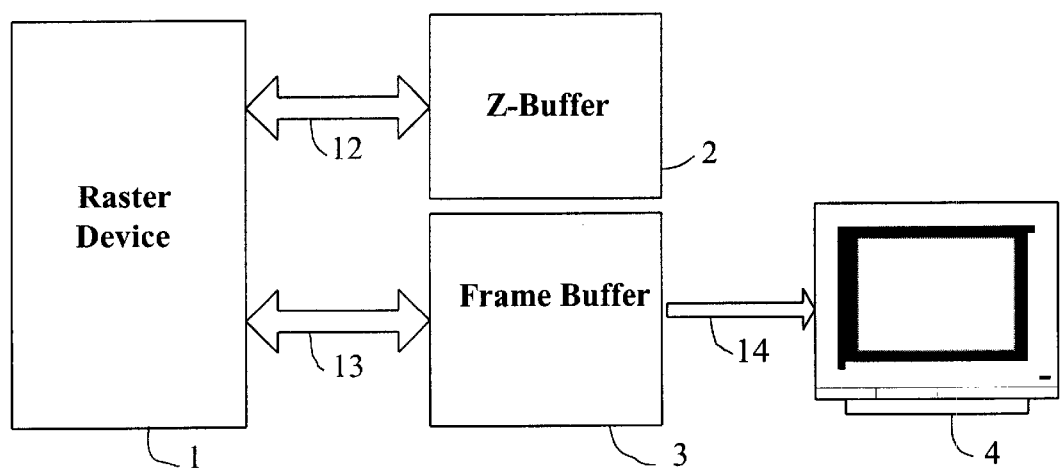
FIG. 1 shows the block diagram of the raster device system.

FIG. 1 depicts the block diagram of a typical raster device in the three-dimensional graphics display system. The raster device 1 performs scanning in a linear manner by sampling points within the image. Z-buffer 2 is a memory which stores the depth value of pixels in three-dimensional coordinate. Frame buffer 3 is a memory which stores R, G, B colors of the foreground, the background and the weighting of foreground colors. The final image is generated by blending the foreground color and the background and outputted to the display monitor 4.

Figure 2:
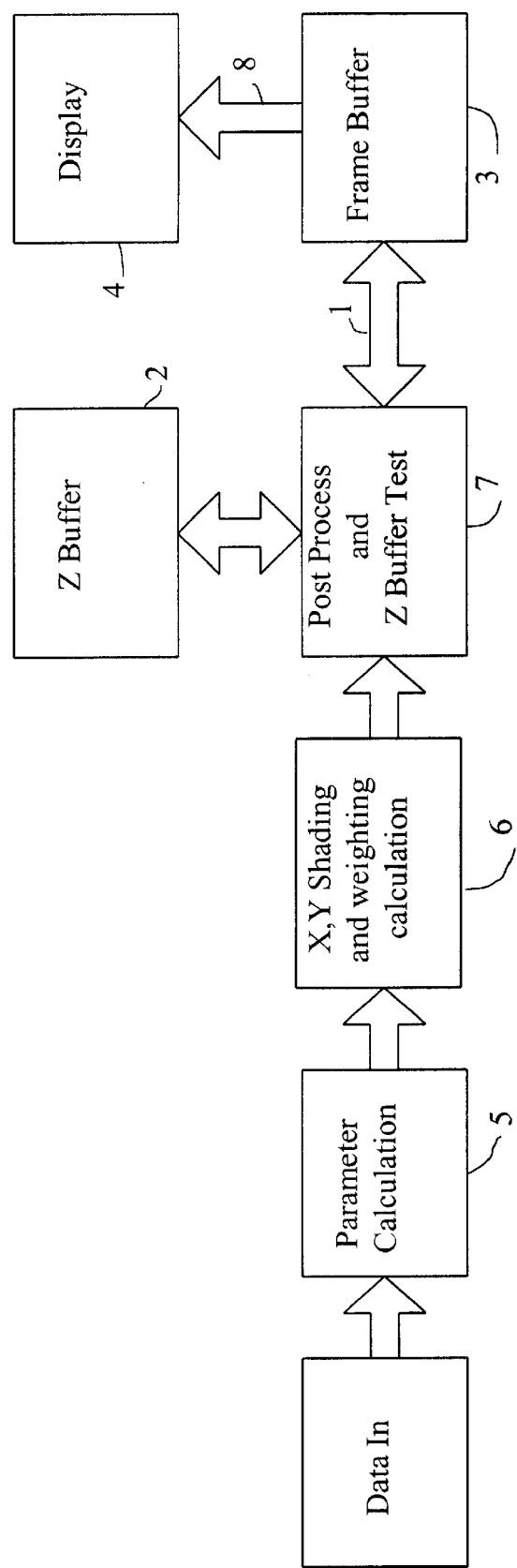
FIG. 2 shows the block diagram of the raster device system according to the present application.
Figure 3:
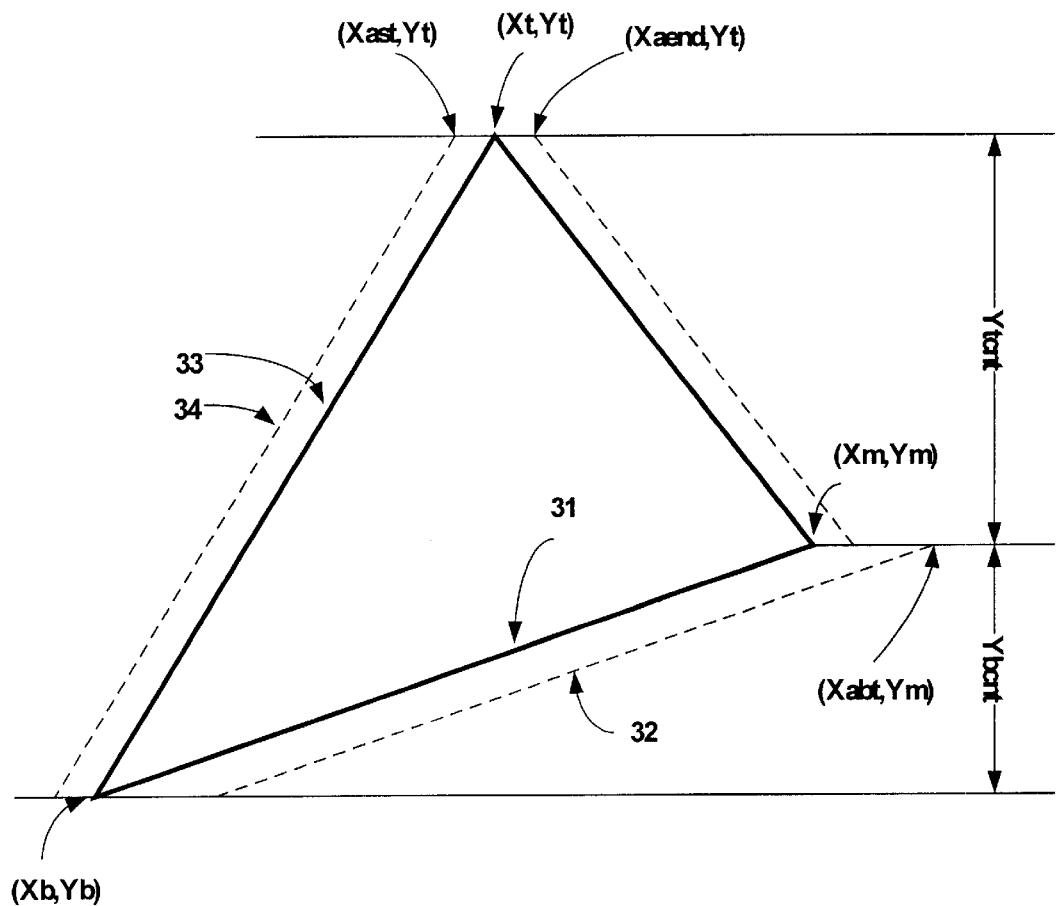
FIG. 3 shows an example of the parameter calculation of the polygon to be processed in FIG. 2.

For three-dimensional graphics, the graphics usually comprise lots of polygons of different shapes. FIG. 2 shows the block diagram of raster device 1' according to the present application. According to the present application, All the blocks in FIG. 2 may be implemented by either hardware or software. The image data of the polygons to be displayed on screen 4 is analyzed in block 5 to obtain the basic parameters of the polygons. According to the present application, all of these polygons to be displayed may be decomposed as at least one triangle, each of which may be classified as one of triangles 51, 52 as shown in FIG. 5. In a general definition of the present application, any line having at least one pixel width and arbitrary length may be classified as a polygon. In the present application, the origin of the display Cartesian coordinates of each of the figures is located at the upper left vertex of the figure and the x coordinate value is increased rightwardly and the y coordinate value is increased downwardly. FIG. 3 is a schematic diagram showing how the basic parameters of the triangles of the decomposed polygons to be displayed are determined in block 5 of FIG. 2.

The following is an example of program of how the parameter calculation in block 5 of FIG. 2 is executed in view of FIG. 5.

- Parameter calculation
```
If (Yb != Yt) Xstdy = (Xb - Xt)/(Yb - Yt)
If (Ym != Yt) Xendy = (Xm - Xt)/(Ym - Yt)
If (Yb != Ym) Xbtdy = (Xb - Xm)/(Yb - Ym)
    Dtest = (Xb - Xt) * (Ym - Yt) - (Yb - Yt) * (Xm - Xt)
        ppd = 1/Dtest
    DYmt = Ym - Yt      DYbt = Yb - Yt
    DXbt = Xb - Xt      DXmt = Xm - Xt
If(Yt == Int(Yt))   then
    {Y = Yt     Xst = Xt     Xend = Xt}
else
    {
    Y = Int(Yt) + 1  CYtf = 1 - Yt.f    Xst = Xt + CYtf*
Xstdy       Xend = Xt + CYtf * Xendy
    }
If(Ym == Int(Ym)) then
    {Ymid = Ym      Xbt = Xm}
else
    {
    Ymid = Int(Ym) + 1      CYmf = 1 - Ym.fXbt = Xm + CYmf
* Xbtdy
    }
If(Yb == Int(Yb))      then
    {Yend = Yb   }
else
    {Yend = Int (Yb) + 1 }
Ytcnt = Ymid - Yst      Ybcnt = Yend - Ymid
Xshft = INT(Xst)      Xmlimt = INT(Xm)      Xblimt = INT
(Xb)
If(EGDRAWDIR = Right to Left)      then
    { If(|Xstdy| ≧ 1)   then   /*Horizontal*/
        { If(Xstdy ≧ 0)   then
            {Xast = Xst + Xstdy,     Xstdx = (Yb - Yt)/
            (Xb - Xt)}
        else
            {Xast = Xst - Xstdy,     Xstdx = (Yb - Yt)/(Xb -
            Xt)}
        else          /*Vertical*/
        {  Xast = Xst + 1}
    If(|Xendy| ≧ 1)   then   /*Horizontal*/
        {  If(Xendy ≧ 0)   then
            {Xaend = Xend - Xendy    Xendx = (Ym - Yt)/
            (Xm - Xt)}
        else
            {Xaend = Xend + Xendy    Xendx = (Ym - Yt)/
            (Xm - Xt)} }
        else          /*Vertical*/
        { Xaend = Xend - 1}
    If(|Xbtdy| ≧ 1)   then   /*Horizontal*/
        { If(Xbtdy ≧ 0)   then
            {Xabt = Xbt - Xbtdy     Xbtdx = (Yb - Ym)/
            (Xb - Xm) }
        else
            {Xabt = Xbt + Xbtdy Xbtdx = (Yb - Ym)/(Xb -
            Xm)} }
        else          /*Vertical*/
        { Xabt = Xbt - 1}
    }
else          /*Left to Right*/
    { If(|Xstdy| ≧ 1)   then   /*Horizontal*/
        { If(Xstdy ≧ 0)   then
            {Xast = Xst - Xstdy,      Xstdx = (Yb - Yt)/
            (Xb - Xt)}
        else
            {Xast = Xst + Xstdy,      Xstdx = (Yb - Yt)/
            (Xb - Xt)}
        else          /*Vertical*/
        { Xast = Xst - 1}
    If(|Xendy| ≧ 1)   then   /*Horizontal*/
        { If(Xendy ≧ 0)   then
            {Xaend = Xend + Xendy      Xendx = (Ym - Yt)
            /(Xm - Xt)}
        else
            {Xaend = Xend - Xendy      Xendx = (Ym - Yt)
            /(Xm - Xt)}
        }
        else          /*Vertical*/
        { Xaend = Xend + 1}
    If(|Xbtdy| ≧ 1)   then   /*Horizontal*/
        { If(Xbtdy ≧ 0)   then
            {Xabt = Xbt + Xbtdy      Xbtdx = (Yb - Ym)/
            (Xb - Xm)}
        else
            {Xabt = Xbt - Xbtdy      Xbtdx = (Yb - Ym)
            /(Xb - Xm)}
        }
        else          /*Vertical*/
        { Xabt = Xbt + 1}
}
```

In view of the above, referring to FIG. 3, the slope of each edge 31, 33 or 35 of the triangles is determined accordingly when the vertices (Xt, Yt), (Xm, Ym) and (Xb, Yb) are given. After the slope of each edge of the triangles is determined, expanding parallel, outwardly in the horizontal dimension a distance of the reciprocal of the absolute value of the slope of the triangle edge from the original triangle edge (31) to obtain the expanded triangle edge 32 if the absolute value of slope of the triangle edge is smaller than one; and expanding parallel, outwardly in the horizontal dimension a distance of one pixel width from the original triangle edge 33 or 35 to obtain the expanded triangle edge 34 or 36 if the absolute value of slope of the triangle edge is greater than one. Why the distance from the expanded edge to the original edge is given as above will be explained below referring to FIGS. 7A–H.

After all the triangle edges are expanded based on their respective slopes, the colors of all the pixels with the expanded regions will be determined by several mathematical algorithms, such as liner or interpolation method or just being assigned simply with the colors of the pixels near the original triangle edges. Besides, the raster device 1' of the present application starts the rasterizing of each triangle from the longest edge, which is referred to as Est in FIG. 5, to the end of the edges, which are referred to as Eend1 and Eend2 in FIG. 5. The following Equations (1), (2), and (3) show the slope of Est, Eend1, and Eend2, respectively.

$$X_{st}dx = Y1-Y3/X1-X3 \qquad \text{Eq. (1)}$$

$$X_{end1}dx = Y1-Y2/X1-X2 \qquad \text{Eq. (2)}$$

$$X_{end2}dx = Y2-Y3/X2-X3 \qquad \text{Eq (3)}$$

As mentioned above, the polygons to be processed are first decomposed as at least one triangle having Est, Eend1 and Eend2 as shown in FIG. 5. In block 5 of FIG. 2, the one parameter left to be determined is the mastering orientation for each of the at least one triangle.

The following is an example of program showing that how the X, Y shadowing and weighting calculation in block 6 of FIG. 2 is executed in view of FIG. 5.

```
• X,Y Shading
   If(EGDRAWDIR = Right to Left) then {op =-, cmp =≧, acmp =
   >}
              else {op =+, cmp =<, acmp =<}
   If (Xst == Int( Xst))      then
       {If(EGDRAWDIR = Right to Left)      then
           {X = Int(Xst) - 1   }
       else
           {X = Int(Xst)   }}
   else
       {If( EGDRAWDIR = Right to Left)      then
           {X = Int(Xst)   }
       else
           {X = Int(Xst) + 1   }
   While(Ytcnt > 0) {
       While (Xcmp Xend) {Calculation weighting X = X op 1 }
   Y = Y + 1
   Xst = Xst + Xstdy    Xend = Xend + Xendy    Ytcnt = Ytcnt - 1
   If(Xst ==Int(Xst))   then
       {If(EGDRAWDIR = Right to Left)    then
           {X = Int(Xst) - 1    }
       else
           {X = Int(Xst)   }}
   else
       {If(EGDRAWDIR = Right to Left)     then
           {X = Int(Xst)   }
       else
           {X = Int(Xst) + 1    }}
   }
   While(Ybcnt > 0){
       While (Xcmp Xbt){
           Weighting calculation
           X = X op 1
           }
   Y = Y + 1
   Xst = Xst + Xstdy    Xbt = Xbt + Xbtdy    Ybcnt = Ybcnt - 1
   If (Xst == Int(Xst))   then
       {If(EGDRAWDIR = Right to Left)     then
           {X = Int(Xst) - 1    }
       else
           {X = Int(Xst)   }}
   else
       {If(EGDRAWDIR = Right to Left)     then
           {X = Int(Xst)   }
       else
           {X = Int(Xst) + 1    }
   }
```

Figure 4:
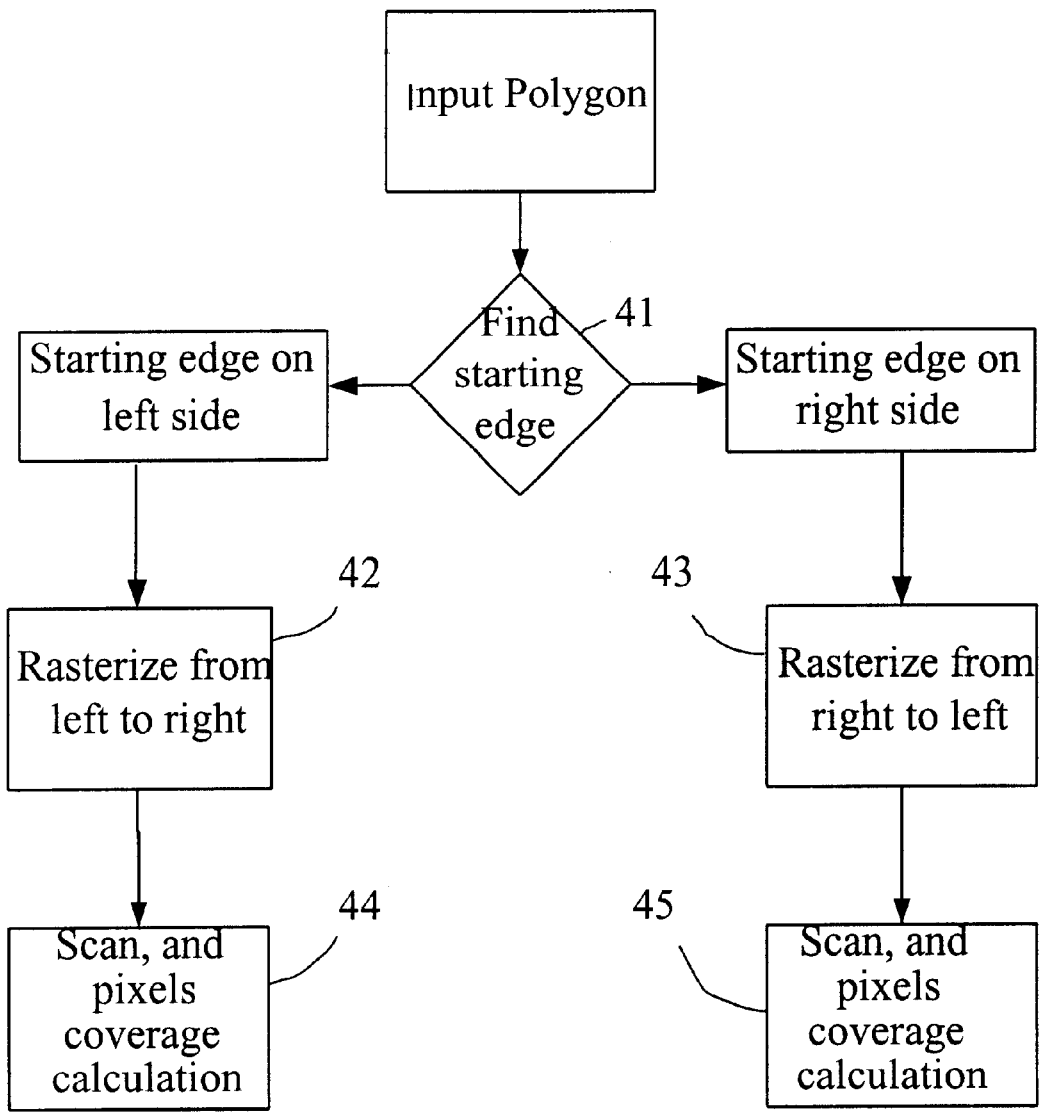
FIG. 4 shows the flow chart of rasterizing.

FIG. 4 shows the flow chart of the rasterization in block 6 of FIG. 2. Generally, rasterizing is the process of scanning and pixel coverage calculation. Referring to FIG. 4, first, searching the longest edge Est of input triangle and determining whether Est is on left or right side of the triangle to be rasterized (step 41). Then rasterizing starts from top to bottom and then left to right of the triangle as shown in triangle 51 of FIG. 5 or right to left as shown in triangle 52 of FIG. 5. Referring to FIG. 5, rasterization starts from the vertex (X1, Y1) by walking a grid (one unit in Y coordinate) distance along edge Est and then walking through the horizontal scan line from Xast to Xend. Namely, the rasterization continues per scan line and proceeds toward Y positive coordinate. As shown in triangle 51, if the Est lies on left side of the triangle, the rastering process starts through the horizontal scan line from left edge Est toward right edges Eend1 and Eend2 (step 42). Also as shown in triangle 52, if the Est lies on right side of the triangle, the rasterizing process starts through the horizontal scan line from right edge Est toward left edges Eend1 and Eend2 (step 43). Steps 44 and 45 performing the rastering line scan process and the calculation of the weighting value for each pixel to be rasterized as in block 6 of FIG. 6 will be detailed below.

Figure 6:
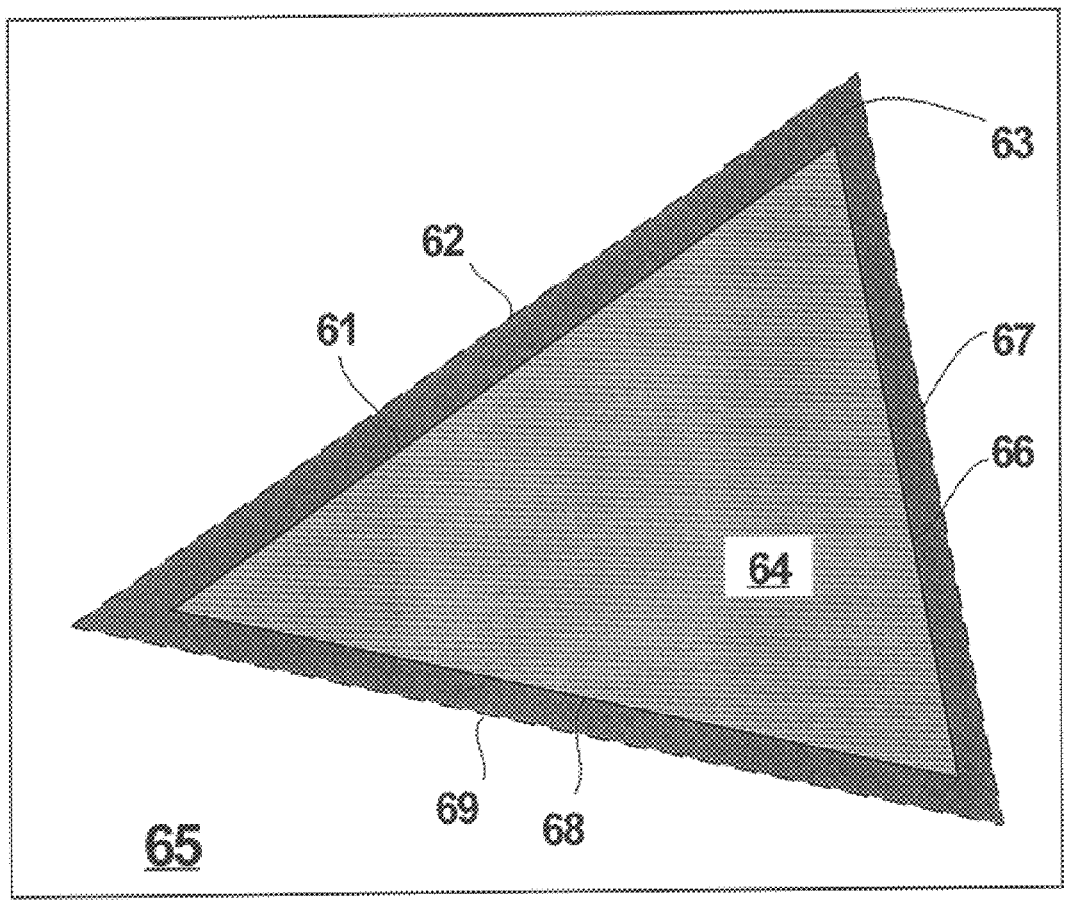
FIG. 6 shows an example of simple anti-aliasing polygon by smoothing jagged edge.

FIG. 6 illustrates an example of the anti-aliasing polygon according to the present application. Too perform anti-aliasing techniques of the present application, the outline of polygon edges 61, 66 and 68 will be expanded outwardly at least one pixel width, thereby generating outer edges 62, 67, and 69, respectively. The pixels between original edge 61 and outer edge 62 is each assigned a weighting value according to the distance from the left upper vertex of the pixel to be rasterized to the original edges 61 or the outer edge 62. Blending these pixels color and background color by these weighting values may generate smooth edges. For example, a part of region 63 between original edge 61 and outer edge 62, generally denoted by oblique lines, is generated to smooth out the jagged edges. The weighting values of pixels within the above part of the region 63 are calculated according to the slopes of edge 61.

Weighting calculation in block 6 of FIG. 2 will be more explained as follows. The anti-aliasing processes of the present invention are directed to smoothing out the oblique edges during rasterizing. These processes are a little bit different while rasterizing different edges at different oblique angles. First of all, the polygons to be displayed are decomposed into plural triangles. All edges of each triangle are classified as either horizontal or vertical edges according to the respective slope of the edges. If the absolute value of the slope is greater than one, this edge is referred to as a vertical edge. Otherwise, if the absolute value of the slope is less than one, this edge is referred to as a horizontal edge. The weighting values of vertical and horizontal edges are calculated based on different algorithms, which will be described below, to obtain anti-aliasing edges.

FIGS. 7A–H show eight cases of rasterizing anti-aliasing polygons with starting edge Est and ending edges Eend1, Eend2 and the anti-aliasing technique for calculating the coverage area of pixels within an expanded region, such as region 63 of FIG. 6 between the original edge such as edges 61 and the expanded edge such as edges 62. According to a preferred embodiment of the present application, the coverage area of every pixel is simply represented by a weighting value ranging from 0.0 to 1.0, where '1.0' means that the original edge such as 61 cover 100% of the present pixel area and '0.0' means no coverage, based on the ratio of the distance between the original edge and the left upper vertex of the pixel to be calculated to one pixel width. The rasterizing process proceeds scan line by scan line, starting at Est and ending at Eend1 or Eend2.

Figure 7A:
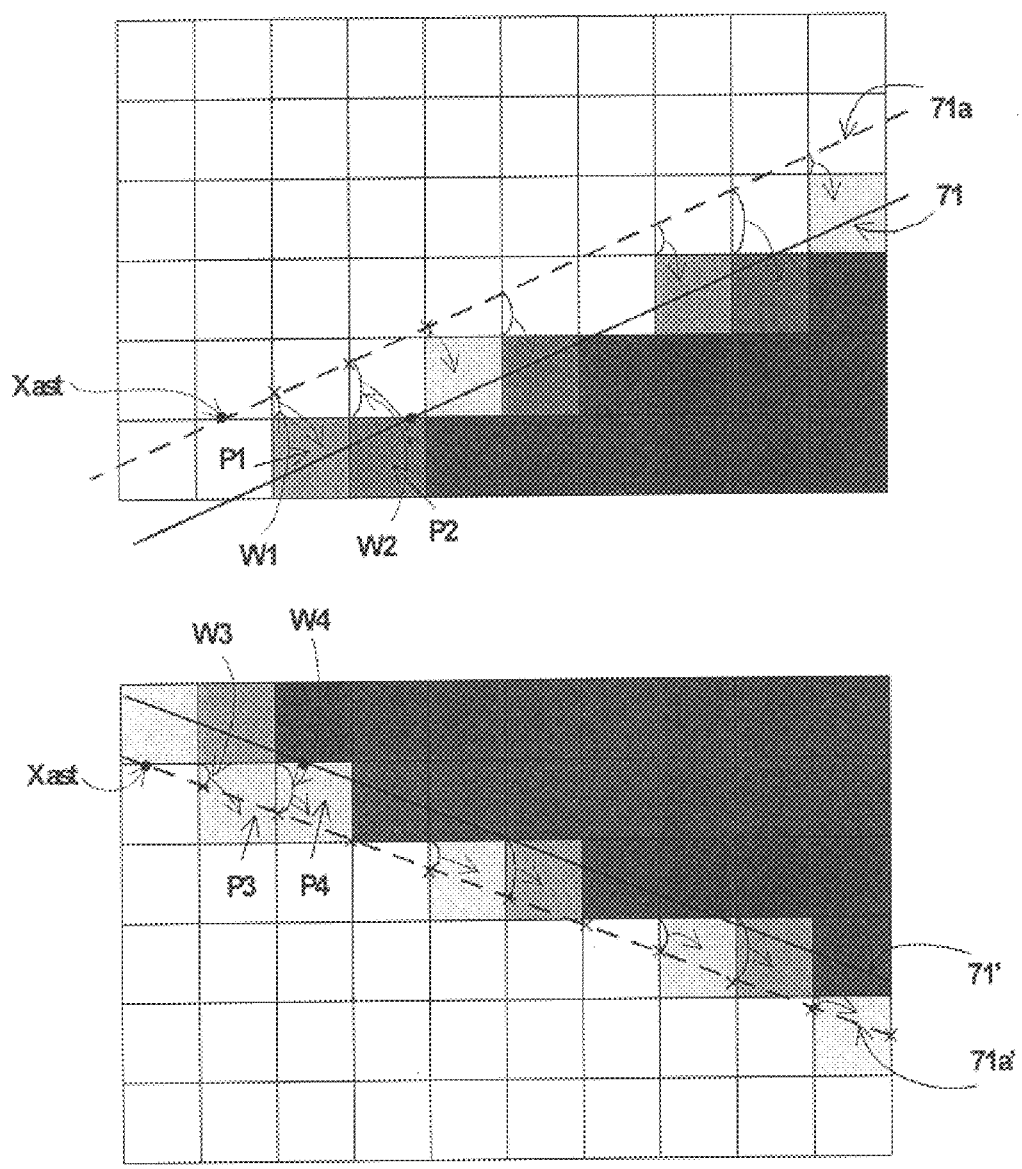

FIG. 7A is the case that Est is horizontal as defined above and lies on the left side of a triangle. Equation (4) given below shows how to calculate weighting values of the pixels between the outer expanded edge 71a and original edge Est 71, where Xstdx as defined in Equation (1) is the slope of edge Est. As mentioned above, after the slope of each original triangle edge is determined, the expanded triangle edge is obtained by expanding parallel, outwardly in the horizontal dimension a distance of the reciprocal of the absolute value of the slope of the triangle edge from the original triangle edge if the absolute value of slope of the triangle edge is smaller than one, or by expanding parallel, outwardly in the horizontal dimension a distance of one pixel width from the original triangle edge if the absolute value of slope of the triangle edge is greater than one.

$$\text{If } (X_{ast} \cdot f) = 0 \qquad\qquad \text{Eq. (4)}$$
$$\{X_{weight} = 0\}$$
else -continued $$\{X_{weight} = (\text{Int}(X_{ast} + 1) - X_{ast}) \cdot |X_{st}dx|\}$$

$$[X + 1]_{weight} = (\text{Int}(X_{ast} + 1) - X_{ast} + 1) \cdot |X_{st}dx|$$

$$= X_{weight} + |X_{st}dx|$$

$$[X + n + 1]_{weight} = [X + n]_{weight} + |X_{st}dx|, \quad n \in N \geq 1$$

where X.f represents the decimal of X, and Int(X) represents the integer part of X.

The principle of the present application mainly derives from the discovery that the slope of each original triangle edge may reveal how the X coordinate values of two pixels to be rasterized at two adjacent Y coordinates change, which is so called the aliasing. If the absolute value of slope of the triangle edge is greater than one, the expanded triangle edge apart from the original edge a distance of the reciprocal of the slope thereof may substantially cover all the pixels filled with an expanded region to compensate for the aliasing. In Equation (4), if the starting point Xast of the rastering process at each scan line is integral in X value, meaning that Xast is located right at the vertical grid line and right at the upper left vertex of the pixel between the outer expanded edge 71a and the original edge Est 71 along each scan line, of course, no weighting value is need for the starting point Xast. Otherwise, according to a preferred embodiment of the present application, the weighting value for each of the pixels within the expanded region such as between edges 71 and 71a is the ratio of the distance in the vertical dimension between the outer expanded edge 71a and the upper left vertex of the pixel to be rasterized to one pixel width. In FIG. 7A, as shown in Equation (4), the weighting value of the pixel nearest to the starting point Xast is the ratio of the distance between the upper left vertex of the nearest pixel and Xast multiplied by the slope of the triangle edge to one pixel width. The sequential weighting values for the pixels along the horizontal scan line are obtained simply by the weighting value of the preceding pixel plus the absolute value of the slope of the outer edge 71a. Because each grid intersection point along the horizontal scan line is one unit apart from each other, the variation in Y coordinate along the outer expanded edge 71a for two adjacent grid intersection points is simply the absolute value of the slope of the outer edge 71a. Obviously, the above calculation for each weighting value can be fulfilled simply by digital logical adders and multipliers or a computer software program for this purpose.

The upper triangle in FIG. 7A shows the Est with positive slope less than one. The rasterizing process starts from the top vertex such as (Xt, Yt) of the triangle, walking through the expanded edge 71a, denoted by a dashed line, associated with the longest edge Est and then through the horizontal scan line along each horizontal grid line. Every horizontal scan line has its starting point Xast at the expanded edge 71a. After this rasterizing process for the current scan line is accomplished, the rastering process then goes down to next new starting point Xast at next horizontal scan line and continues to rasterize this scan line. In the upper polygon in FIG. 7A, the area coverage calculation of the pixels within the expanded region is shown. For example, the pixels P1 and P2 between the outer expanded edge 71a and the original edge 71 are partial covered by the original edge 71 of the triangle and their upper left vertices are right to the outer expanded edge 71a, and their weighting values are calculated in terms of Equation (4) according to the ratio of the distances between the outer expanded edge 71a and the upper left vertices of P1, P2 to one pixel width. According to a preferred embodiment of the present application, Xweight W1 shows the area coverage percentage of pixel P1, and [X+1]weighting W2 shows the area coverage percentage of pixel P2 by simply adding the absolute value of the slope Xstdx of the original edge 71 to Xweight W1 since each grid point along the horizontal scan line is one (pixel) unit width and the variation in Y coordinate along the outer expanded edge 71a for two adjacent grid points is simply the absolute value of the slope of the outer expanded edge 71a. The area coverage of pixels on the right side of pixel P2 along the scan line are full covered by original edge 71 of the triangle and thus the weighting value thereof are all assigned one.

The lower triangle in FIG. 7A shows the case that the slope of Est 71 is between '0' and '−1' and Est 71' lies on the left side of a triangle. The Equation for weighting value in this case is substantially the same as that of the upper triangle in FIG. 7A except for a small difference in Equation (4), in which Xweight W3 is for pixel P3, and [X+1] weighting W4 is for pixel P4. As shown in FIG. 2, the weighting value of each pixel is calculated in raster device 1' and then stored in the frame buffer memory 3 via bus 13.

Now referring to FIG. 7B, Est 72 now is horizontal and lies on the right side of a triangle. The rasterizing process of FIG. 7B is similar with that of FIG. 7A except that the horizontal scan line starts from right toward left. Equation (5) shows the calculation of the weighting value in this case.

$$\text{If } (X_{ast} \cdot f) = 0 \qquad \text{Eq. (5)}$$

$$\{X_{weight} = 0\}$$

else $$\{X_{weight} = (X_{ast} - \text{Int}(X_{ast})) \cdot |X_{st}dx|\}$$

$$[X - 1]_{weight} = (X_{ast} - \text{Int}(X_{ast}) + 1) \cdot |X_{st}dx|$$

$$= X_{weight} + |X_{st}dx|$$

$$[X - n - 1]_{weight} = [X - n]_{weight} + |X_{st}dx|, \quad n \in N \geq 1$$

where X.f represents the decimal of X, and Int(X) represents the integer part of X.

FIGS. 7C and 7D depict vertical Est rasterizing from left to right and right to left, respectively. As mentioned above, after the slope of each original triangle edge is determined, if the absolute value of slope of the triangle edge is greater than one, the expanded triangle edge is obtained by expanding parallel, outwardly in the horizontal dimension a distance of one pixel width from the original triangle edge. The principle of the present application mainly derives from the discovery that the slope of each original triangle edge may reveal how the X coordinate values of two pixels to be rasterized at two adjacent Y coordinates change, which is the aliasing. If the absolute value of slope of the triangle edge is smaller than one, the expanded triangle edge apart from the original edge in the horizontal dimension a distance of the reciprocal of the slope of Est may substantially cover all the pixels filled to compensate for the aliasing. Since each of the absolute value of the slope of the longest edges 73, 73' is greater than one, as described above, the distance in the horizontal dimension from the expanded triangle edges 73a, 73a' to the original edges 73, 73', respectively, i.e., the reciprocal of each of the slope of the longest edges 73, 73', is smaller than one pixel width for compensating for the aliasing. However, in the present application, because the weighting value for each pixel within the expanded region is calculated pixel by pixel, the distance in the horizontal dimension from the expanded triangle edges 73a, 73a' to the original edges 73, 73', respectively is assigned one pixel width for the cases of FIGS. 7C and 7D. Therefore, only the weighting value, Xweight, of one pixel between the outer expanded edges 73a, 73a' and the original edges 73, 73' along each scan line is calculated. In this case, the calculation of the weighting value is simple. It's the decimal of the starting point or bit wise inverter decimal part of the starting point as shown in the following Equations (6) and (7). In Equation (6), if the starting point Xast of the rastering process at each scan line is an integer in X value, meaning that Xast is located right at the vertical grid line and right at the upper left vertex of the pixel between the outer expanded edges 73a, 73a' and the original edges 73, 73' along each scan line, of course, no weighting value is need for the starting point Xast. Otherwise, the weighting value for the only one pixel with the expanded region is the ratio of the distance between Xast and the upper left vertex, right to Xast, of the pixel between the outer expanded edges 73a, 73a' and the original edges 73, 73' along each scan line to one pixel width. Namely, Xweight in this case is just the ratio of the distance between Xast and the grid point, right to Xast, along the scan line to one pixel width. In another preferred embodiment of the present application, Xweight in this case is also one minus the ratio of the distance in the horizontal dimension between the grid point, right to Xast, along the scan line and the original edge 73 or 73' to one pixel width. Also, as seen in Equation (6), Xweight can be represented approximately by the bit wise inverse of decimal part of Xast.

$$\text{If } (X_{ast} \cdot f) == 0 \quad \text{Eq. (6)}$$
$$\{X_{weight} = 0\}$$
else
$$\{X_{weight} = (\text{Int}(X_{ast} + 1) - X_{ast}) \approx \text{Not}(X_{ast} \cdot f)\}$$

where Int(X) represents the integer part of X, Not(X) represents the bit-wise inverse of X, and X.f represents the decimal of X.

In Equation (7) for vertical Est rasterizing from right to left, if the starting point Xast of the rastering process at each scan line is an integer in X value, meaning that Xast is located right at the vertical grid line and right at the upper right vertex of the pixel between the outer expanded edges 74a, 74a' and the original edges 74, 74' along each scan line, the weighting value for the starting point Xast is surely assigned as 1. Otherwise, the weighting value for the only pixel within the expanded region is the ratio of the distance between Xast and the upper left vertex, left to Xast, of the pixel between the outer expanded edges 74a, 74a' and the original edges 74, 74' along each scan line to one pixel width. Namely, Xweight in this case is just the ratio of the distance between Xast and the grid point, left to Xast, along the scan line to one pixel width. In another preferred embodiment of the present application, Xweight in this case is also one minus the ratio of the distance in the horizontal dimension between the grid point, right to Xast, along the scan line and the original edge 74 or 74' to one pixel width. Also, as seen in Equation (7), Xweight can be represented by the decimal of Xast.

$$\text{If } (X_{ast} \cdot f) == 0 \quad \text{Eq. (7)}$$
$$\{X_{weight} = 1\}$$
else
$$\{X_{weight} = X_{ast} - \text{Int}(X_{ast}) = X_{ast} \cdot f\}$$

where Int(X) represents the integer part of X, Not(X) represents the bit-wise inverse of X, and X.f represents the decimal of X.

FIG. 7E shows the case of the horizontal edge Eend when rasterizing from left to right. The calculation of weighting values between original edges Eend 75, 75' and the outer expanded edge 75a, 75a', respectively in this case is shown in Equations (8). As mentioned above, every horizontal scan line always starts at Xst and ends at Xaend. After this rasterizing process for the current scan line is accomplished, the rastering process goes to the next new starting point Xast at the next horizontal scan line and continues to rasterize this scan line. In the upper triangle of FIG. 7E, the area coverage calculation is shown. For example, the pixels P14 and P15 between the outer expanded edge 75a and the original edge 75 are partial covered by the original edge 75 of the triangle and their upper left vertices are left to the outer expanded edge 75a and their weighting values are calculated in terms of Equation (8) according to the distances in the vertical dimension from original edge 75 to the upper left vertices of the pixels within the expanded region. Namely, according to FIG. 7E, the weighting values for pixels between the outer expanded edges 75a, 75a' and the original edges 75, 75' are one minus the ratios of the distances between the original edges 75, 75' and the upper left vertices of the pixels to be rasterized to one pixel width. According to another preferred embodiment of the present application, the weighting values for pixels between the outer expanded edges 75a, 75a' and the original edges 75, 75' may also be the ratios of the distances in the vertical dimension between the outer expanded edges 75a, 75a' and upper left vertices of the pixels to be rasterized to one pixel width. Xweight W14 shows the area coverage percentage of P14, and [X+1] weighting W15 shows the area coverage percentage of P15 calculated by simply adding the absolute value of Xenddx to Xweight W14 because each grid point along the horizontal scan line is one unit width and the variation in the Y coordinate along the outer expanded edge 75a or 75a' for two adjacent grid points is simply the absolute value of the slope of the original edge 75 or 75'. The area coverage of each of pixels on the left side of P14 along the scan line is fully covered by original edge 75 of the triangle and thus the weighting value thereof is "1".

$$\text{If } (X_{end} \cdot f) == 0 \quad \text{Eq. (8)}$$
$$\{X_{weight} = 0\}$$
else
$$\{X_{weight} = \text{Not}((\text{Int}(X_{end} + 1) - X_{end}) \cdot |X_{end}dx|)\}$$
$$[X + 1]_{weight} = \text{Not}((\text{Int}(X_{end} + 1) - X_{end}) \cdot |X_{end}dx| + X_{end}dx|)$$
$$= X_{weight} + |X_{end}dx|$$
$$[X + n + 1]_{weight} = [X + n]_{weight} + |X_{st}dx|, \quad n \in N \geq 1$$

FIG. 7F shows the case of the horizontal edge Eend when rasterizing from right to left. The rasterizing process of Eend1 and Eend2 in FIG. 7F are all the same as Eend. The calculation of weighting values between the original edges Eend 76, 76' and the outer expanded edges, 76a and 76a' in this case is shown in Equation (9). Every horizontal scan line ends at Xend. After this rasterizing process for the current scan line is accomplished, the rastering process goes down to next new starting point Xast at next horizontal scan line and continues to rasterize this scan line to Xend. In the upper triangle, in FIG. 7F, the area coverage calculation is shown. For example, the pixels P18 and P19 between the outer expanded edge 76a and the original edge 76 are partial covered by the original edge 76 of the triangle and their upper left vertices are left to the outer expanded edge 76a, and their weighting values are calculated in terms of Equation (9) according to the distance in the vertical dimension from the left upper vertex of the pixel to be rasterized to the original edge 76. Namely, according to FIG. 7F, the weighting values for pixels between the outer expanded edge 76a and original edge 76 are one minus the ratios of the distances between original edge 76 and the left upper vertices of the pixels within the expanded region to one pixel width. According to another preferred embodiment of the present application, the weighting values for pixels between the outer expanded edge 76a and original edge 76 may also be the ratios of the distances in the vertical dimension between the outer expanded edge 76a and upper left vertices of the pixels to be rasterized to one pixel width.

$$\text{If } (X_{end} \cdot f) == 0 \quad\quad\quad \text{Eq. (9)}$$

$$\{X_{weight} = 0\}$$

else $$\{X_{weight} = \text{Not}(X_{end} - \text{Int}(X_{end})) \cdot |X_{end}dx|)\}$$

$$[X+1]_{weight} = \text{Not}(X_{end} - \text{Int}(X_{end})) \cdot |X_{end}dx|) +$$

$$|X_{end}dx|$$

$$= X_{weight} + |X_{end}dx|$$

$$[X+2]_{weight} = [X+1]_{weight} + |X_{end}dx|$$

FIG. 7G shows the case of vertical edge Eend when rasterizing from left to right based on Equation (10).

$$\text{If } (X_{aend} \cdot f) == 0 \quad\quad\quad \text{Eq. (10)}$$

$$\{X_{weight} = 1\}$$

else $$\{X_{weight} = X_{aend} - \text{Int}(X_{aend}) = X_{aend} \cdot f\}$$

FIG. 7H shows the case of vertical edge Eend when rasterizing from right to left based on Equation (11). As mentioned above, after the slope of each original triangle edge is determined, if the absolute value of slope of the triangle edge is greater than one, the expanded triangle edge 78a is obtained by expanding parallel, outwardly in the horizontal dimension a distance of one pixel width from the original triangle edge 78. As mentioned above in FIGS. 7C and 7D, because the weighting value for each pixel within the expanded region is calculated pixel by pixel, the distance in the horizontal dimension from the expanded triangle edges 78a, 78a' to the original edges 78, 78' is assigned one pixel width for the cases of FIGS. 7G and 7H. Therefore, only the weighting value, Xweight, of one pixel between the outer expanded edges 78a, 78a' and the original edges 78, 78' along each scan line is calculated. In this case, calculation of weighting value is simple: It's the decimal of start point or bit wise inverter decimal part of starting point as shown in the following Equations (10) and (11). In Equation (10), if the ending point Xend of the rastering process at each scan line is an integer, meaning that Xend is located right at the vertical grid line and right at the upper left vertex of the pixel between the outer expanded edges 78a, 78a' and the original edges 78, 78' along each scan line, of course, no weighting value is needed for the ending point Xend. Otherwise, the weighting value for the only pixel within the expanded region is the ratio of the distance between Xaend and the upper left vertex, right to Xaend, of the pixel between the outer expanded edges 78a, 78a' and the original edges 78, 78' along each scan line to one pixel width. Namely, Xweight in this case is just the ratio of the distance between Xaend and the grid point, right to Xaend, along the scan line to one pixel width. In another preferred embodiment of the present application, Xweight in this case is also one minus the ratio of the distance in the horizontal dimension between the grid point, night to Xaend, along the scan line and the original edges 78, 78' to one pixel width. Also, as seen in Equation (11), Xweight can be represented approximately by the bit wise inverse of decimal part of Xaend.

$$\text{If } (X_{aend} \cdot f) == 0 \quad\quad\quad \text{Eq. (11)}$$

$$\{X_{weight} = 0\}$$

else $$\{X_{weight} = \text{Int}(X_{aend} + 1) - X_{aend} \approx \text{Not}(X_{aend} \cdot f)\}$$

Given the above, all possible orientations of edges Est and Eend are shown in FIG. 7A–H. When the slope of edge is near zero, revealing that there are plural pixels within expanded region between the original edge and the outer edge, the anti-aliasing process consumes more time to calculate weighting values of these pixels.

Figure 8:
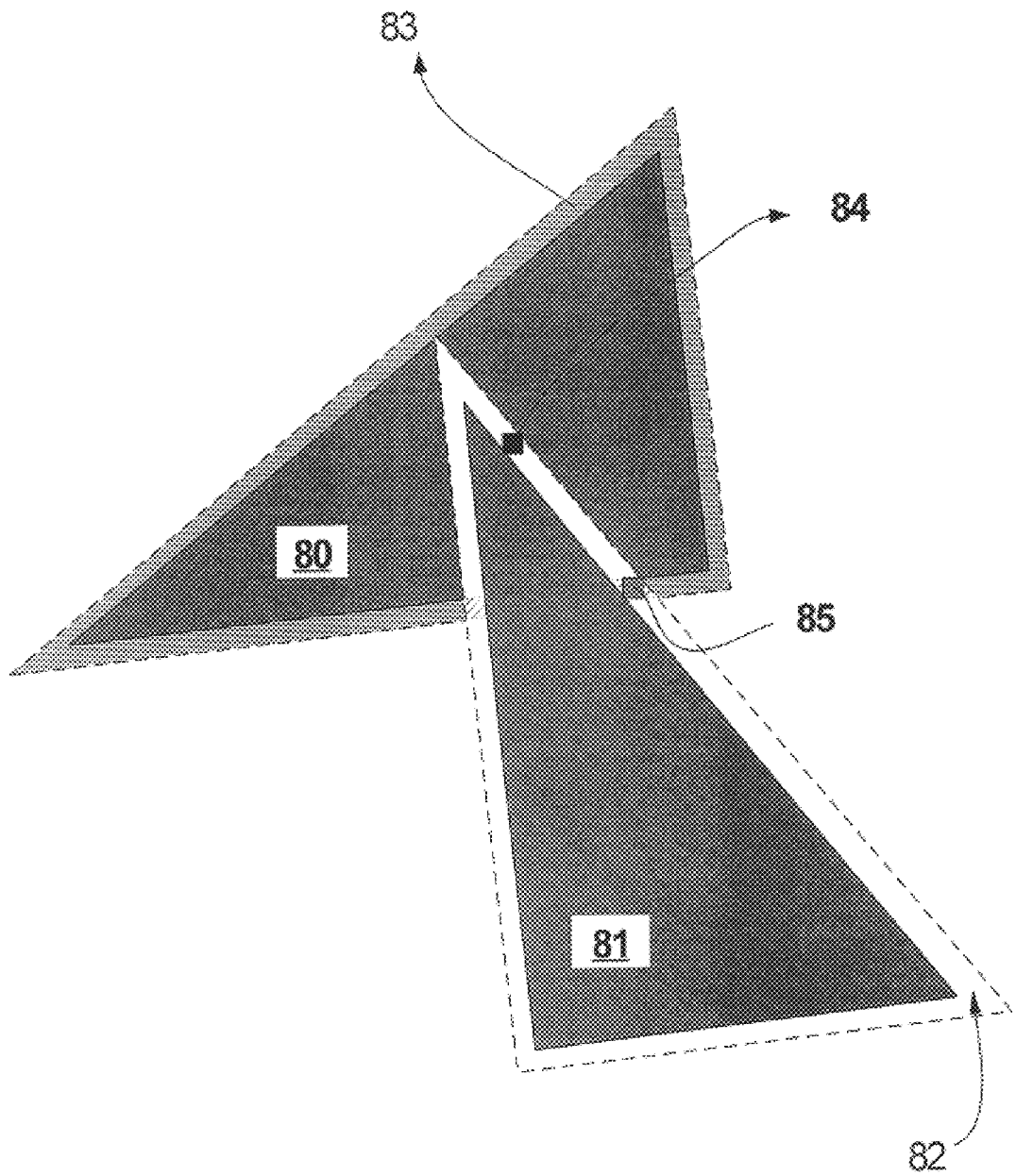
FIG. 8 shows an example of two overlapped anti-aliasing polygons.

FIG. 8 shows the case of two overlapped triangles in which triangle 80 is behind triangle 81, meaning that pixels within triangle 81 are deeper than pixels within triangle 80 with respect to the viewer. This is accomplished by Z-buffer depth test block 7 of FIG. 2, which will be detailed below. Namely, pixels in expanded regions 82 and 83 are generated by raster device 1' to smooth out the jagged edge (not exactly shown in FIG. 8). This smoothing process has been shown in FIG. 7A–H.

As mentioned above, in the conventional three-dimensional graphics display system, all of the polygons must be sorted in depth order to make sure that the final color after blending is accurate. However, in the invention, the nearest and second nearest pixel information is stored in Z buffer 2 and Frame buffer 3 of FIG. 2 having double memory locations, such as first Z sub-buffer 101 and second Z sub-buffer 102, first frame buffer and second Frame sub-buffer, respectively. Here, "nearest pixel" refers to the pixel on the display 4 closest to the viewer. The above information stored in Z buffer 2 and Frame buffer 3 comprises of the depth of the nearest pixel, its color (hereinafter referred to as foreground color) and weighting value, depth of the second nearest pixel and its color (hereinafter referred to as background color).

FIG. 9 shows the flow chart of Z-buffer test 7 of FIG. 2 to achieve the anti-aliasing according to the present invention. In step 51, raster device 1' shown in FIG. 2 processes pixel by pixel the incoming pixel Px having color Cx, depth Zx and weighting value Wx sent from block 6 of FIG. 2. The color Cx and weighting value Wx of the incoming pixel are generated by the raster device 1' after smoothing out jagged edge. Then in step 52, the default depth values of nearest pixel P1 stored in the first Z sub-buffer and the depth value of second nearest pixel P2 stored in the second sub-buffer are fetched, wherein P1 and P2 may be defined as, for example, the pixels closest to and second closest to the viewer, respectively, or the pixel second farthest from and farthest from the viewer, respectively, at the beginning of programming of the Z buffer test 7. C1, the foreground color, is the color of P1 and C2, the background color, is the color of P2. In step 53, determining whether the weighting value Wx of currently incoming pixel is 1, which means that this incoming pixel is within the original triangle rather than within the expanded region. The case Wx='1' (step 54) will be first discussed below. If the incoming pixel Px is behind P2 (step 55), then this pixel Px is invisible to the viewer and may be discarded (step 56). Otherwise, if the incoming pixel Px is in front of P2 and behind P1 (step 57), then updating P2 with Px and color C2 with Cx (step 58). Furthermore, if the incoming pixel Px is in front of P1 (step 59), then replacing P2 with P1, C2 with C1 and updating P1 with Px, C1 with Cx and weighting value of the corresonding pixel in the Frame Buffer 3 with Wx (step 60). In the case of Wx≠1 (step 61), meaning that this incoming pixel is within the expanded region generated by the raster device 1' as shown in FIGS. 7A–7H, if Px is behind P2 (step 62), then discarding this pixel (step 63) Otherwise, if Px is in front of P2 and behind P1 (step 64), such as the pixels within region 83 behind region 85 of FIG. 8, then just updating background color C2 with Cx but the depth Z2 remains unchanged (step 65). This is because that when Wx≠1, the incoming pixel Px is generated by block 6 of FIG. 2 and lies within the expanded region of the original triangle's outline, for example, region 83 in FIG. 8. Px doesn't appear in the original polygon, thus its depth value is unnecessary to be updated in the Z-buffer 2. When Px is in front of P1 (step 66), then replacing Z2 with Z1 and Z1 with Zx in the Z buffer 2 and updating C2 with C1, C1 with Cx and the weighting value of the corresponding pixel in the Frame buffer with Wx(step 67).

Figure 10A:
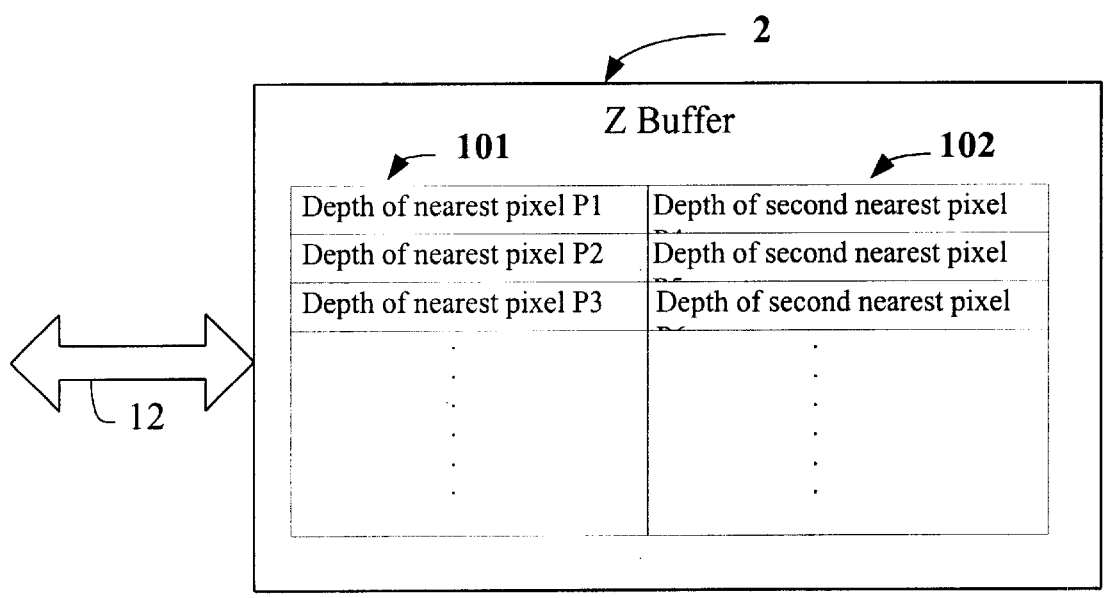
FIG. 10A shows more detail of Z-Buffer 2 in FIG. 1.
Figure 10B:
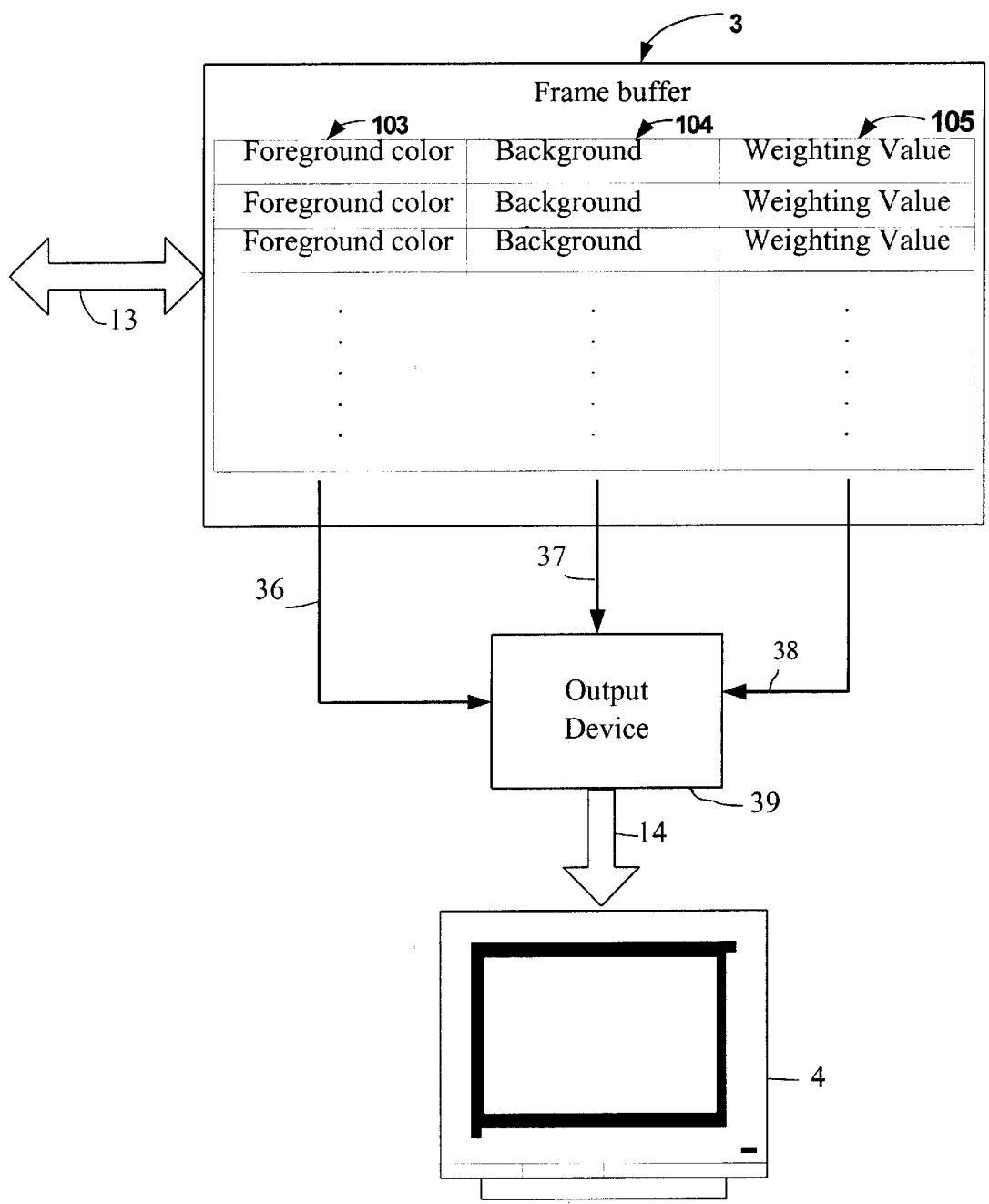
FIG. 10B shows more detail of Frame-Buffer 3 in FIG. 1.

FIGS. 10A and 10B show the contents of Z-buffer 2 and Frame buffer 3. It is sufficient to store the whole image frame that Z sub-buffers 101 and 102 in Z buffer 2 and sub-frame buffers 103, 104, and 105 each has a memory size of (1024×1024) locations, each of which has 256 (2^16) bits. After the rasterizing process of the whole image frame on the display 4 is finished, the Frame buffer 3 sends the foreground color, background color and weighting value of each pixel to be displayed to output device 39, which blends the foreground color and the background color to produce the final color utilizing the following Equation:

Final color=weighting value·foreground color+(1− weighting value)·background color For example, pixel 84 in FIG. 8 is part of the overlap of the expanded region 82 the triangle 81 and the triangle 80. The final color of pixel 84 is obtained by blending the color of triangle 81 and the color of triangle 80 (the background color) according to the weighting value of pixel 84. Similarly, pixel 85 is part of the overlap of region 82 and region 83. The final color of pixel 85 is also obtained by blending the color of region 83 and that of region 82 according to the weighting value of pixel 25. The colors of the pixels within of region 82, as stated above, may be by several mathematical algorithms, such as liner or interpolation method or just being assigned simply with the colors of the pixels near the original triangle edges. The output device 39 then calculates and outputs the final color to the display monitor.

Although the invention has been disclosed in terms of a preferred embodiment, the disclosure is not intended to limit the invention. The invention still can be modified, varied by persons skilled in the art without departing from the scope and spirit of the invention which is determined by the claims below.

What is claimed is:

1. A method for improving the image quality of a plurality of polygons overlapped and interlaced with one another in a three-dimensional graphics display system, wherein the three-dimensional graphics is represented by a two dimensional plane composed of a plurality of pixels in the horizontal and vertical dimensions, respectively, and depth of each pixel of the polygons, comprising the steps of:

(a) decomposing each of the plurality of polygons as at least one triangle;

(b) obtaining expanded regions for each of the at least one triangle of the decomposed polygon by expanding parallel, outwardly each edge of the at least one triangle a distance no less than one pixel width from the original triangle edge, wherein the distance is determined based on the slope of each of the triangle edges; and (c) rastering each decomposed triangle per horizontal pixel line to obtain weighting values of pixels within the expanded regions, the weighting value being associated with the distances between pixels at the rasterized line and one of the expanded triangle edge and the original triangle edge.

2. A method of claim 1 wherein each of the decomposed triangle in step (a) is classified as of two types having left longest edge and right longest edge, respectively, and the rastering in step (c) proceeds from the expanded longest edge of the triangle to the original two edges of the triangle on the other side.

3. A method of claim 1 wherein step (b) further comprising the steps of:

(b1) expanding parallel, outwardly in the horizontal dimension a distance of the reciprocal of the absolute value of the slope of the triangle edge from the original triangle edge if the absolute value of slope of the triangle edge is smaller than one; and (b2) expanding parallel, outwardly in the horizontal dimension a distance of one pixel width from the original triangle edge if the absolute value of slope of the triangle edge is greater than one.

4. A method of claim 2 wherein step (c) further comprising at least one of the steps of:

(c1) obtaining weighting value of each pixel within the expanded region of the starting edge, the slope of which in absolute value is smaller than one, along the mastering line by calculating one of the following:

(c11) the ratio of the distance in the vertical dimension between the left upper vertex of the pixel to be calculated at the rastering line and the expanded starting edge to one pixel width; and (c12) one minus the ratio of the distance in the vertical dimension between the left upper vertex of the pixel to be calculated at the rastering line and the original starting edge to one pixel width;

(c2) obtaining weighting value of each pixel within the expanded area of the starting edge, the slope of which in absolute value is greater than one, along the rastering line by calculating one of the following:

(c21) the ratio of the distance in the horizontal dimension between the left upper vertex of the pixel to be calculated at the rastering line and the expanded starting edge to one pixel width; and (c22) one minus the ratio of the distance in the horizontal dimension between the left upper vertex of the pixel to be calculated at the rastering line and the original starting edge to one pixel width;

(c3) obtaining weighting value of each pixel within the expanded area of the ending edge, the slope of which in absolute value is smaller than one, along the mastering line by calculating one of the following:

(c31) one minus the ratio of the distance in the vertical dimension between the left upper vertex of the pixel to be calculated at the rastering line and the original ending edge to one pixel width; and (c32) the ratio of the distance in the vertical dimension between the left upper vertex of the pixel to be calculated at the rastering line and the expended ending edge to one pixel width; and (c4) obtaining the weighting value of each pixel within the expanded area of the ending edge, the slope of which in absolute value is greater than one, along the rastering line by calculating one of the following:

(c41) one minus the ratio of the distance in the horizontal dimension between the left upper vertex of the pixel to be calculated at the rastering line and the original ending edge to one pixel width; and (c42) the ratio of the distance in the horizontal dimension between the left upper vertex of the pixel to be calculated at the rastering line and the expanded ending edge to one pixel width.

5. A method of claim 1 further comprising the steps of:

(d) storing the depth value of the rasterized pixel nearest to the viewer and the second nearest depth value of the rasterized pixel in a Z-buffer in a memory;

(e) storing respective colors and weighting values of the nearest pixel and the second nearest pixel in a frame buffer in a memory; and (f) blending the color of the nearest pixel and that of the second nearest pixel according to the weighting value in the frame buffer.

6. A method of claim 5 wherein step (d) further comprising the steps of:

(d1) performing a Z-buffer depth test based on the weighting value and depth value of the rasterized pixel; and (d2) storing the color of nearest pixel, color of second nearest pixel and the weighting value in the frame buffer and updating the frame buffer according to the result of the Z buffer depth test.

7. A method of claim 6 wherein step (d2) further comprising at least one of the steps of:

(d21) if the weighting value of the rasterized pixel equals to one, then performing the Z-buffer depth test as follows:

(1) discarding the rasterized pixel if the rasterized pixel is behind the second nearest pixel;

(2) updating the second nearest depth value with the depth value of the rasterized pixel and updating background color with the color of the rasterized color if the depth of the incoming pixel is between the nearest pixel and the second nearest pixel; and (3) if the rasterized pixel is in front of the nearest pixel, replacing the depth value of the second nearest pixel with the depth value of the nearest pixel and replacing the background color with the foreground color, updating the depth value and color of the nearest pixel with the depth value and color of the rasterized pixel and updating the weighting value of the corresponding pixel in the frame buffer with the weighting value of the rasterized pixel; and (d22) if the weighting value of the rasterized pixel is not equal to one, then the Z buffer depth test is given as follows:

(4) discarding the rasterized pixel if the rasterized pixel is behind the second nearest pixel;

(5) updating the background color with the color of the rasterized pixel if the depth value of the rasterized pixel is between the nearest pixel and second nearest pixel; and (6) if the rasterized pixel is in front of the nearest pixel, replacing the depth value of the second nearest pixel with the depth value of the nearest pixel and replacing the background color with the foreground color, updating the depth value and color of the nearest pixel with the depth value and color of the rasterized pixel and updating the weighting value of the corresponding pixel in the frame buffer with the weighting value of the rasterized pixel.

8. A computer readable medium recorded with a program that enables a computer to perform a method for improving the image quality of a plurality of polygons overlapped and interlaced with one another in a three-dimensional graphics display system of the computer, wherein the three-dimensional graphics is represented by a two dimensional plane composed of a plurality of pixels in the horizontal and vertical dimensions, respectively, and depth of each pixel of the polygons, comprising the steps of:

(a) decomposing each of the plurality of polygons as at least one triangle;

(b) obtaining expanded regions for each of the at least one triangle of the decomposed polygon by expanding parallel, outwardly each edge of the at least one triangle a distance from the original triangle edge, wherein said distance is determined based on the slope of each of the triangle edges; and (c) rastering each decomposed triangle per horizontal pixel line to obtain weighting values of pixels within the expanded regions, said weighting values being associated with the distances between pixels at the rasterized line and one of the expanded triangle edge and the original triangle edge.

9. A computer readable medium of claim 8 wherein each of the decomposed triangle in step (a) is classified as of two types having left longest edge and right longest edge, respectively, and the rastering in step (c) proceeds from the expanded longest edge of the triangle to the original two edges of the triangle on the other side.

10. A computer readable medium of claim 8 wherein step (b) further comprising the steps of:

(b1) expanding parallel, outwardly in the horizontal dimension a distance of the reciprocal of the absolute value of the slope of the triangle edge from the original triangle edge if the absolute value of slope of the triangle edge is smaller than one; and (b2) expanding parallel, outwardly in the horizontal dimension a distance of one pixel width from the original triangle edge if the absolute value of slope of the triangle edge is greater than one.

11. A computer readable medium of claim 9 wherein step (c) further comprising at least one of the steps of:

(c1) obtaining weighting value of each pixel within the expanded region of the starting edge, the slope of which in absolute value is smaller than one, along the rastering line by calculating one of the following:

(c11) the ratio of the distance in the vertical dimension between the left upper vertex of the pixel to be calculated at the rastering line and the expanded starting edge to one pixel width; and (c12) one minus the ratio of the distance in the vertical dimension between the left upper vertex of the pixel to be calculated at the rastering line and the original starting edge to one pixel width;

(c2) obtaining weighting value of each pixel within the expanded area of the starting edge, the slope of which in absolute value is greater than one, along the rastering line by calculating one of the following:

(c21) the ratio of the distance in the horizontal dimension between the left upper vertex of the pixel to be calculated at the rastering line and the expanded starting edge to one pixel width; and (c22) one minus the ratio of the distance in the horizontal dimension between the left upper vertex of the pixel to be calculated at the rastering line and the original starting edge to one pixel width;

(c3) obtaining weighting value of each pixel within the expanded area of the ending edge, the slope of which in absolute value is smaller than one, along the mastering line by calculating one of the following:

(c31) one minus the ratio of the distance in the vertical dimension between the left upper vertex of the pixel to be calculated at the rastering line and the original ending edge to one pixel width; and (c32) the ratio of the distance in the vertical dimension between the left upper vertex of the pixel to be calculated at the rastering line and the expended ending edge to one pixel width; and (c4) obtaining the weighting value of each pixel within the expanded area of the ending edge, the slope of which in absolute value is greater than one, along the rastering line by calculating one of the following:

(c41) one minus the ratio of the distance in the horizontal dimension between the left upper vertex of the pixel to be calculated at the rastering line and the original ending edge to one pixel width; and (c42) the ratio of the distance in the horizontal dimension between the left upper vertex of the pixel to be calculated at the mastering line and the expanded ending edge to one pixel width.

12. A computer readable medium of claim 8 further comprising the steps of:

(d) storing the depth value of the rasterized pixel nearest to the viewer and the second nearest depth value of the rasterized pixel in a Z-buffer in a memory;

(e) storing respective colors and weighting values of the nearest pixel and the second nearest pixel in a frame buffer in a memory; and (f) blending the color of the nearest pixel and that of the second nearest pixel according to the weighting value in the frame buffer.

13. A computer readable medium of claim 12 wherein step (d) further comprising the steps of:

(d1) performing a Z-buffer depth test based on the weighting value and depth value of the incoming pixel; and (d2) storing the color of nearest pixel, color of second nearest pixel and the weighting value in the frame buffer and updating the frame buffer according to the result of the Z buffer depth test.

14. A method of claim 13 wherein step (d2) further comprising at least one of the steps of:

(d21) if the weighting value of the rasterized pixel equals to one, then performing the Z-buffer depth test as follows:

(1) discarding the rasterized pixel if the rasterized pixel is behind the second nearest pixel;

(2) updating the second nearest depth value with the depth value of the rasterized pixel and updating background color with the color of the rasterized color if the depth of the incoming pixel is between the nearest pixel and the second nearest pixel; and (3) if the rasterized pixel is in front of the nearest pixel, replacing the depth value of the second nearest pixel with the depth value of the nearest pixel and replacing the background color with the foreground color, updating the depth value and color of the nearest pixel with the depth value and color of the rasterized pixel and updating the weighting value of the corresponding pixel in the frame buffer with the weighting value of the rasterized pixel; and (d22) if the weighting value of the rasterized pixel is not equal to one, then the Z-buffer depth test is given as follows:

(4) discarding the rasterized pixel if the rasterized pixel is behind the second nearest pixel;

(5) updating the background color with the color of the rasterized pixel if the depth value of the rasterized pixel is between the nearest pixel and second nearest pixel; and (6) if the rasterized pixel is in front of the nearest pixel, replacing the depth value of the second nearest pixel with the depth value of the nearest pixel and replacing the background color with the foreground color, updating the depth value and color of the nearest pixel with the depth value and color of the rasterized pixel and updating the weighting value of the corresponding pixel in the frame buffer with the weighting value of the rasterized pixel.

15. An apparatus for improving the image quality of a plurality of polygons overlapped and interlaced with one another in a three-dimensional graphics display system, wherein the three-dimensional graphics is represented by a two dimensional plane composed of a plurality of pixels in the horizontal and vertical dimensions, respectively, and depth of each pixel of the polygons, the apparatus comprising:

means (a) for decomposing each of the plurality of polygons as at least one triangle;

means (b) for obtaining expanded regions for each of the at least one triangle of the decomposed polygon by expanding parallel, outwardly each edge of the at least one triangle a distance from the original triangle edge, wherein said distance is determined based on the slope of each of the triangle edges; and means (c) for mastering each decomposed triangle per horizontal pixel line to obtain weighting values of pixels within the expanded regions, said weighting values being associated with the distances between pixels at the rasterized line and one of the expanded triangle edge and the original triangle edge.

16. An apparatus of claim 15 wherein each of the decomposed triangle in means (a) is classified as of two types having left longest edge and right longest edge, respectively, and the rastering in means (c) proceeds from the expanded longest edge of the triangle to the original two edges of the triangle on the other side.

17. An apparatus of claim 15 wherein means (b) further comprising:

means (b1) for expanding parallel, outwardly in the horizontal dimension a distance of the reciprocal of the absolute value of the slope of the triangle edge from the original triangle edge if the absolute value of slope of the triangle edge is smaller than one; and means (b2) for expanding parallel, outwardly in the horizontal dimension a distance of one pixel width from the original triangle edge if the absolute value of slope of the triangle edge is greater than one.

18. An apparatus of claim 16 wherein means (c) further comprising at least one of the following:

means (c1) for obtaining weighting value of each pixel within the expanded region of the starting edge, the slope of which in absolute value is smaller than one, along the rastering line by calculating one of the following:
  (c11) the ratio of the distance in the vertical dimension between the left upper vertex of the pixel to be calculated at the mastering line and the expanded starting edge to one pixel width; and
  (c12) one minus the ratio of the distance in the vertical dimension between the left upper vertex of the pixel to be calculated at the rastering line and the original starting edge to one pixel width;

means (c2) for obtaining weighting value of each pixel within the expanded area of the starting edge, the slope of which in absolute value is greater than one, along the rastering line by calculating one of the following:
  (c21) the ratio of the distance in the horizontal dimension between the left upper vertex of the pixel to be calculated at the rastering line and the expanded starting edge to one pixel width; and
  (c22) one minus the ratio of the distance in the horizontal dimension between the left upper vertex of the pixel to be calculated at the rastering line and the original starting edge to one pixel width;

means (c3) for obtaining weighting value of each pixel within the expanded area of the ending edge, the slope of which in absolute value is smaller than one, along the rastering line by calculating one of the following:
  (c31) one minus the ratio of the distance in the vertical dimension between the left upper vertex of the pixel to be calculated at the mastering line and the original ending edge to one pixel width; and
  (c32) the ratio of the distance in the vertical dimension between the left upper vertex of the pixel to be calculated at the rastering line and the expended ending edge to one pixel width; and means (c4) for obtaining the weighting value of each pixel within the expanded area of the ending edge, the slope of which in absolute value is greater than one, along the rastering line by calculating one of the following:
  (c41) one minus the ratio of the distance in the horizontal dimension between the left upper vertex of the pixel to be calculated at the rastering line and the original ending edge to one pixel width; and
  (c42) the ratio of the distance in the horizontal dimension between the left upper vertex of the pixel to be calculated at the rastering line and the expanded ending edge to one pixel width.

19. An apparatus of claim 15 further comprising:
a Z-buffer in a memory for storing the depth value of the rasterized pixel nearest to the viewer and the second nearest depth value of the rasterized pixel;
a frame buffer in a memory for storing respective colors and weighting values of the nearest pixel and the second nearest pixel; and
means for blending the color of the nearest pixel and that of the second nearest pixel according to the weighting value in the frame buffer.

20. An apparatus of claim 19 wherein the Z buffer further comprising:
means (d1) for performing a Z-buffer, depth test based on the weighting value and depth value of the incoming pixel; and
means (d2) for storing the color of nearest pixel, color of second nearest pixel and the weighting value in the frame buffer and updating the frame buffer according to the result of the Z buffer depth test.

21. An apparatus of claim 20 wherein means (d2) further comprising means for:
(d21) if the weighting value of the rasterized pixel equals to one, then performing the Z-buffer depth test as follows:
  (1) discarding the rasterized pixel if the rasterized pixel is behind the second nearest pixel;
  (2) updating the second nearest depth value with the depth value of the rasterized pixel and updating background color with the color of the rasterized color if the depth of the incoming pixel is between the nearest pixel and the second nearest pixel; and
  (3) if the rasterized pixel is in front of the nearest pixel, replacing the depth value of the second nearest pixel with the depth value of the nearest pixel and replacing the background color with the foreground color, updating the depth value and color of the nearest pixel with the depth value and color of the rasterized pixel and updating the weighting value of the corresponding pixel in the frame buffer with the weighting value of the rasterized pixel; and
(d22) if the weighting value of the rasterized pixel is not equal to one, then the Z-buffer depth test is given as follows:
  (4) discarding the rasterized pixel if the rasterized pixel is behind the second nearest pixel;
  (5) updating the background color with the color of the rasterized pixel if the depth value of the rasterized pixel is between the nearest pixel and second nearest pixel; and
  (6) if the rasterized pixel is in front of the nearest pixel, replacing the depth value of the second nearest pixel with the depth value of the nearest pixel and replacing the background color with the foreground color, updating the depth value and color of the nearest pixel with the depth value and color of the rasterized pixel and updating the weighting value of the corresponding pixel in the frame buffer with the weighting value of the rasterized pixel.

* * * * *